US011764998B2

(12) United States Patent
Kishikawa et al.

(10) Patent No.: US 11,764,998 B2
(45) Date of Patent: Sep. 19, 2023

(54) FRAME TRANSFER METHOD AND SECURE STAR COUPLER

(71) Applicant: Panasonic Intellectual Property Corporation of America, Torrance, CA (US)

(72) Inventors: Takeshi Kishikawa, Osaka (JP); Yoshihiro Ujiie, Osaka (JP); Ryo Hirano, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 275 days.

(21) Appl. No.: 17/089,277

(22) Filed: Nov. 4, 2020

(65) Prior Publication Data

US 2021/0051090 A1    Feb. 18, 2021

Related U.S. Application Data

(63) Continuation of application No. PCT/JP2019/029252, filed on Jul. 25, 2019.

(30) Foreign Application Priority Data

Jul. 27, 2018 (WO) .................. PCT/JP2018/028294

(51) Int. Cl.
*H04L 12/44* (2006.01)
*H04L 12/40* (2006.01)
*H04L 12/417* (2006.01)

(52) U.S. Cl.
CPC ........ *H04L 12/44* (2013.01); *H04L 12/40013* (2013.01); *H04L 12/417* (2013.01); *H04L 2012/40241* (2013.01)

(58) Field of Classification Search
CPC . H04L 12/44; H04L 12/40013; H04L 12/417; H04L 2012/40241
(Continued)

(56) References Cited

U.S. PATENT DOCUMENTS 11,539,727 B2* 12/2022 Haga .................. H04L 63/1416
11,632,384 B2* 4/2023 Sasaki ................ H04L 63/1425
726/22
(Continued)

FOREIGN PATENT DOCUMENTS

| JP | 2010-503305 | 1/2010 |
| JP | 2010-35171 | 2/2010 |

(Continued)

OTHER PUBLICATIONS

International Search Report (ISR) dated Oct. 9, 2018 in International (PCT) Application No. PCT/JP2018/028294.
(Continued)

*Primary Examiner* — Douglas B Blair
(74) *Attorney, Agent, or Firm* — Wenderoth, Lind & Ponack, L.L.P.

(57) ABSTRACT

A secure star coupler in a communication network adopting a time-triggered protocol based on a time slot include: transceivers each of which is connected to one of branches and transmits and receives signals; a routing table holder that holds a predetermined rule indicating a correspondence between a time slot and a branch; and a router that routes a signal received from a first branch to another branch unless a no-transfer condition is satisfied. The no-transfer condition includes a condition that the predetermined rule is not followed by the first branch and a condition that routing of a signal received from a second branch different from the first branch has started in the time slot.

9 Claims, 16 Drawing Sheets

(58) Field of Classification Search
USPC .......................................................... 709/252
See application file for complete search history.

(56) References Cited

U.S. PATENT DOCUMENTS

| | | | | |
|---|---|---|---|---|
| 2010/0014439 | A1* | 1/2010 | Fuhrmann | H04L 12/40013 |
| | | | | 370/252 |
| 2010/0020828 | A1 | 1/2010 | Angelow | |
| 2010/0220744 | A1* | 9/2010 | Ungermann | H04L 12/40006 |
| | | | | 370/458 |
| 2010/0262689 | A1* | 10/2010 | Ungermann | H04L 12/40032 |
| | | | | 709/224 |
| 2012/0096210 | A1* | 4/2012 | Milbredt | H04L 12/417 |
| | | | | 710/306 |
| 2014/0328352 | A1 | 11/2014 | Mabuchi et al. | |
| 2016/0366686 | A1* | 12/2016 | Steiner | H04L 12/44 |
| 2017/0072876 | A1* | 3/2017 | Rajan | H04L 45/52 |
| 2018/0167360 | A1 | 6/2018 | Maeda et al. | |
| 2018/0300477 | A1* | 10/2018 | Galula | H04L 63/1416 |

FOREIGN PATENT DOCUMENTS

| | | |
|---|---|---|
| JP | 4871395 | 2/2012 |
| JP | 5664799 | 2/2015 |
| WO | 2008/029318 | 3/2008 |
| WO | 2008/029320 | 3/2008 |
| WO | 2013/094072 | 6/2013 |
| WO | 2017/061079 | 4/2017 |

OTHER PUBLICATIONS

International Search Report (ISR) dated Sep. 24, 2019 in International (PCT) Application No. PCT/JP2019/029252.
Communication under Rule 71(3) EPC dated Dec. 7, 2021 in corresponding European Patent Application No. 19841931.9.

* cited by examiner

CONNECTED TO SECURE STAR COUPLER 300

| PARAMETER | VALUE |
|---|---|
| TRANSFER SPEED | 10 Mbps |
| SLOT ID OF STATIC SEGMENT | 1 – 50 |
| SLOT ID OF DYNAMIC SEGMENT | 51 – 100 |
| PAYLOAD LENGTH OF STATIC SLOT | 8 |
| ⋮ | ⋮ |

FIG. 8

| RECEPTION BRANCH | RECEPTION SLOT ID | CYCLE COUNT | PAYLOAD LENGTH | PAYLOAD | PREAMBLE INDICATOR | ERROR FLAG |
|---|---|---|---|---|---|---|
| 100b | 98 | 4 | 8 | 0x00 11 22.... | 0 | 0 |
| 100a | 3 | 4 | 8 | 0x30 11 01... | 0 | 0 |
| 100c | 1 | 4 | 8 | 0x10 00 5F.... | 0 | 0 |
| ... | ... | ... | ... | ... | ... | ... |

FIG. 9

| SLOT ID | CYCLE OFFSET | CYCLE RECEPTION | TRANSMISSION SOURCE BRANCH |
|---|---|---|---|
| 1 | 0 | 1 | 100c |
| 3 | 0 | 2 | 100a |
| ⋮ | ⋮ | ⋮ | ⋮ |
| 99 | 1 | 2 | 100b |
| ⋮ | ⋮ | ⋮ | ⋮ |

FIG. 10

| SLOT ID | CYCLE OFFSET | CYCLE RECEPTION | FRAME NAME | PAYLOAD INFORMATION | TRANSMISSION SOURCE | BRANCH |
|---|---|---|---|---|---|---|
| 1 | 0 | 1 | A | SPEED | 200c | 100c |
| 2 | | | | | | |
| 3 | 0 | 2 | B | STEERING ANGLE | 200a | 100a |
| ⋮ | | | | | | |
| 98 | 1 | 2 | C | GEAR STATUS | 200b | 100b |
| 99 | 0 | 4 | D | CAMERA INFORMATION 1 | 200d | 100d |
| | 1 | 4 | E | CAMERA INFORMATION 2 | 200d | 100d |
| | 2 | 4 | F | CAMERA INFORMATION 3 | 200d | 100d |
| | 3 | 4 | G | CAMERA INFORMATION 4 | 200d | 100d |

FIG. 11

| FRAME NAME | PAYLOAD LENGTH | RECEPTION RULE |
|---|---|---|
| A | 8 | SPEED Δ < 0.5 km/h |
| B | 8 | Δ < 30° |

FIG. 12

| BRANCH | ANOMALY LEVEL |
|---|---|
| 100a | 0 |
| 100b | 0 |
| 100c | 0 |
| 100d | 20 |

FIG. 13

| FRAME NAME | PREVIOUS RECEPTION VALUE | RECEPTION TIME (μs) |
|---|---|---|
| A | 40.5 km/h | 12100 |
| B | 5° | 8140 |
| C | D | 12400 |
| D | DETECTION OF VEHICLE AHEAD | 1440 |
| E | DETECTION OF PEDESTRIAN | 5480 |
| F | DETECTION OF LANE | 9520 |
| G | REAR CAMERA IN INACTIVE STATE | 13560 |
| VEHICLE STATUS | MOVING | |

FIG. 18

| SLOT ID | CYCLE OFFSET | CYCLE RECEPTION | RECEPTION BRANCH | PAYLOAD | CONDITION MAKING BLACKLIST EFFECTIVE |
|---|---|---|---|---|---|
| 20 | 3 | 4 | 100d | ** 5* ... | MOVING, AND BRANCH ANOMALY LEVEL > 30 |
| 10 | 0 | 2 | 100a | FF 11 **... | ALWAYS |
| ⋮ | ⋮ | ⋮ | ⋮ | ⋮ | ⋮ |

FIG. 19

| VEHICLE STATUS | MOVING |
|---|---| ize # FRAME TRANSFER METHOD AND SECURE STAR COUPLER

This application is a U.S. continuation application of PCT International Patent Application Number PCT/JP2019/029252 filed on Jul. 25, 2019, claiming the benefit of priority of PCT International Patent Application Number PCT/JP2018/028294 filed on Jul. 27, 2018, the entire contents of which are hereby incorporated by reference.

BACKGROUND

1. Technical Field

The present disclosure relates to a secure star coupler that prevents transmission of an anomalous frame in a star topology communication network.

2. Description of the Related Art

In recent years, an in-vehicle system of an automobile includes multiple devices called electronic control units (hereinafter, referred to as ECUs). A communication network that connects these ECUs is called an in-vehicle network. Many standards have been developed for such an in-vehicle network. Although one of the current most leading standards is a Controller Area Network (hereinafter, referred to as CAN [registered trademark]), FlexRay (registered trademark) is designed as a protocol faster and more reliable than CAN.

FlexRay expresses a value "0" and a value "1" on the basis of a voltage difference between two wires, which are a twisted pair. ECUs connected to a bus are called nodes. Each of the nodes connected to the bus transmits and receives messages called frames, similarly to CAN. In contrast to the event-triggered communication protocol adopted in CAN, FlexRay adopts Time Division Multiple Access (hereinafter, referred to as TDMA) that is a time-triggered protocol. In a FlexRay in-vehicle network, frames are transmitted at predetermined timings in a predetermined order.

Meanwhile, a CAN in-vehicle network has a security threat that an attacker accesses the bus and transmits an anomalous frame to falsely control an ECU. Security measures against such a threat are now under study.

For example, Japanese Patent No. 5664799 (hereinafter, referred to as Patent Literature 1 (PTL 1)) proposes an in-vehicle network monitoring device that detects whether a frame is transmitted to a bus at predetermined communication intervals. A method disclosed in PTL 1 determines a frame transmitted regardless of the predetermined communication intervals to be anomalous, and thereby prevents control performed using an anomalous frame.

Unfortunately, the anomaly detection method disclosed in PTL 1 cannot be applied to the FlexRay in-vehicle network, in which communications at the predetermined communication intervals allow a frame having a specific identifier (ID) to be received at constant intervals.

Moreover, a star network topology is often used in FlexRay in terms of ease of design. Japanese Patent No. 4871395 (hereinafter, referred to as Patent Literature 2 (PTL 2)) discloses an intelligent star coupler that changes a branch of a transfer destination, according to a time schedule. The intelligent star coupler can prevent attack frame injection from a branch that is not originally scheduled for frame transmission. However, this coupler is incapable of detecting an attack attempt. Furthermore, the intelligent star coupler disclosed in PTL 2 is incapable of preventing anomalous frame injection from an anomalous node existing in a branch that is originally scheduled for frame transmission.

To solve the aforementioned problems, the present disclosure has an object to implement a safer communication network system by providing a frame transfer method and a secure star coupler that enable anomalous-frame handling through determining a transmission source of an anomalous frame in a communication network that adopts a time-triggered protocol implemented in a star topology.

SUMMARY

According to an aspect of the present disclosure, a secure star coupler in a communication network adopting a time-triggered protocol based on a time slot, the communication network including a plurality of branches that are connected to each other via the secure star coupler and each of which includes at least one communication device and a bus, the at least one communication device transmitting and receiving a frame in a corresponding predetermined time slot, the secure star coupler, including: a routing rule holder; a router; and a plurality of transceivers each of which is connected to a corresponding one of the plurality of branches, wherein the routing rule holder holds a predetermined rule indicating a correspondence between (i) a time slot and (ii) one of (ii-1) a transmission source branch among the plurality of branches that transmits a physical signal to be transferred by the secure star coupler in the time slot and (ii-2) a transceiver connected to the transmission source branch among the plurality of transceivers, the plurality of transceivers include a first transceiver, the first transceiver receiving a physical signal from a bus of a first branch connected to the first transceiver among the plurality of branches, converting the physical signal into a first digital signal, the router routes the first digital signal to a transceiver other than the first transceiver among the plurality of transceivers, unless a no-transfer condition is satisfied, the transceiver other than the first transceiver converts the first digital signal routed into a physical signal, and transmits the physical signal to a bus of a branch other than the first branch among the plurality of branches, and the no-transfer condition includes: a first condition that one of the first branch and the first transceiver does not follow the predetermined rule; and a second condition that the router is routing a second digital signal to a branch other than a second branch among the plurality of branches in a current time slot, the second digital signal being generated by converting a physical signal received from the second branch into the second digital signal.

According to another aspect of the present disclosure, a frame transfer method used in a communication network adopting a time-triggered protocol based on a time slot, the communication network including a plurality of branches that are connected to each other via a secure star coupler and each of which includes a bus and at least one communication device, the at least one communication device transmitting and receiving a frame in a corresponding predetermined time slot, the frame transfer method, comprising: holding a predetermined rule indicating a correspondence between a time slot and a transmission source branch, the transmission source branch being a branch among the plurality of branches and transmitting a physical signal to be transferred by the secure star coupler in the time slot; converting a physical signal received from a bus of a first branch among the plurality of branches into a first digital signal; routing the first digital signal to a branch other than the first branch among the plurality of branches unless a no-transfer condition is satisfied; and converting the first digital signal routed in the routing into a physical signal, and transmitting the physical signal to a bus of the branch other than the first branch, wherein the no-transfer condition includes: a first condition that the first branch does not follow the predetermined rule; and a second condition that a second digital signal is being routed to a branch other than a second branch among the plurality of branches in a current time slot, the second digital signal being generated by converting a physical signal received from the second branch into the second digital signal, the second branch being different from the first branch.

The general and specific aspects according to the above-described embodiments may be implemented to a system, a method, an integrated circuit, a computer program, or a computer-readable recording medium such as a Compact Disc-Read Only Memory (CD-ROM), or may be any combination of them.

The present disclosure enables a star topology communication network adopting the time-triggered protocol to handle an anomalous frame by determining a transmission source of the anomalous frame. Thus, the safety of a communication network system as a whole can be maintained more reliably.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 8 illustrates an example of received-frame information stored in a received-frame information holder according to Embodiments 1 and 2.

FIG. 9 illustrates an example of a routing table stored in a routing table holder according to Embodiments 1 and 2.

FIG. 10 illustrates an example of frame information stored in a frame information holder according to Embodiments 1 and 2.

FIG. 11 illustrates an example of frame rules stored in a frame rule holder according to Embodiments 1 and 2.

FIG. 12 illustrates an example of branch anomaly levels stored in a branch anomaly-level holder according to Embodiments 1 and 2.

FIG. 13 illustrates an example of a reception history stored in a reception history holder according to Embodiments 1 and 2.

FIG. 18 illustrates an example of a blacklist stored in a blacklist holder according to Embodiment 2.

FIG. 19 illustrates an example of a vehicle status stored in a vehicle status holder according to Embodiment 2.

DETAILED DESCRIPTION OF THE EMBODIMENTS

Figure 1:
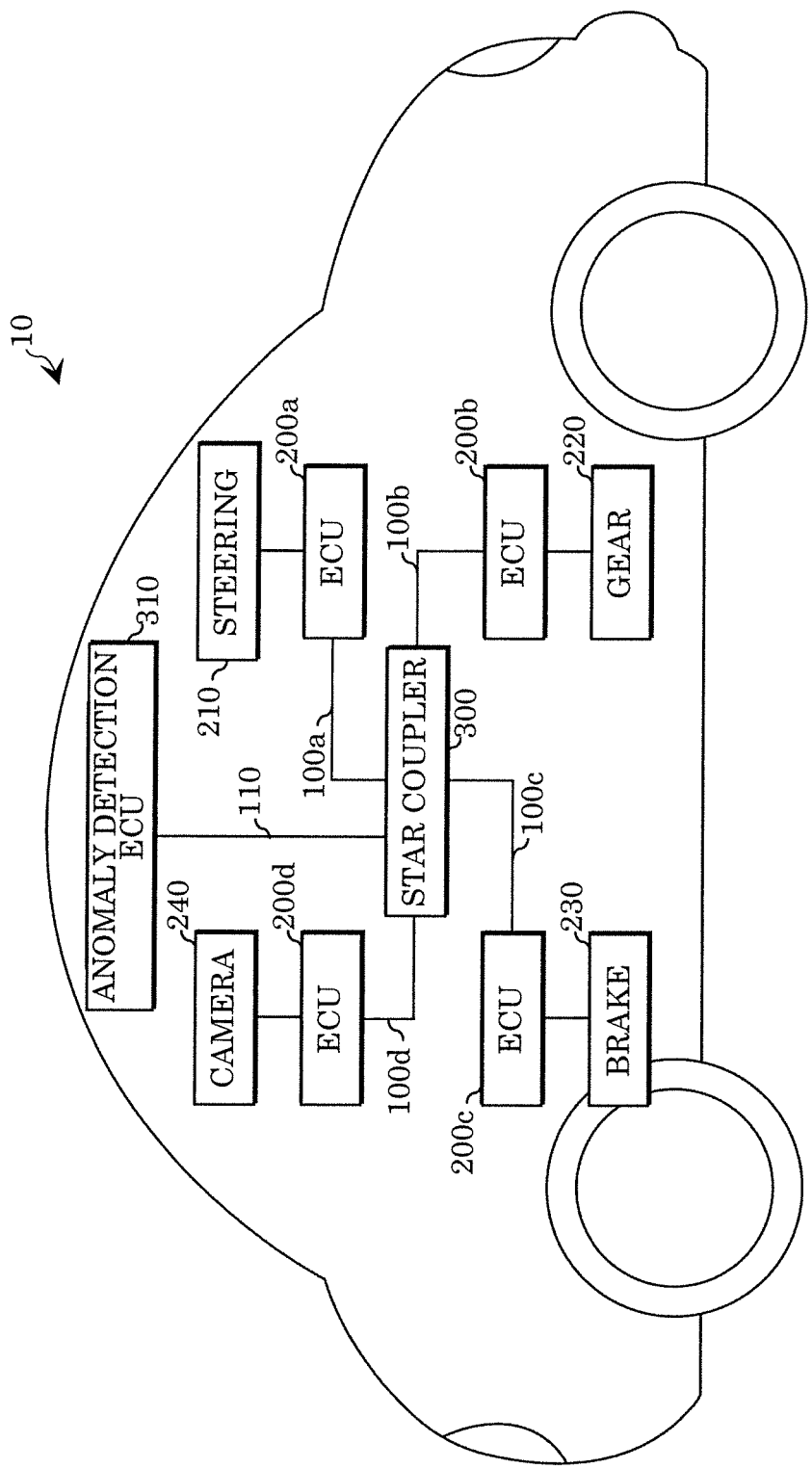
FIG. 1 is a block diagram illustrating an overall configuration of an in-vehicle network system according to Embodiments 1 and 2.

According to an aspect of the present disclosure, a secure star coupler in a communication network adopting a time-triggered protocol based on a time slot, the communication network including a plurality of branches which are connected to each other via the secure star coupler and each of which includes at least one communication device and a bus, the at least one communication device transmitting and receiving a frame in a corresponding predetermined time slot, the secure star coupler, including: a routing rule holder; a router; and a plurality of transceivers each of which is connected to a corresponding one of the plurality of branches, wherein the routing rule holder holds a predetermined rule indicating a correspondence between (i) a time slot and (ii) one of (ii-1) a transmission source branch among the plurality of branches that transmits a physical signal to be transferred by the secure star coupler in the time slot and (ii-2) a transceiver connected to the transmission source branch among the plurality of transceivers, the plurality of transceivers include a first transceiver, the first transceiver receiving a physical signal from a bus of a first branch connected to the first transceiver among the plurality of branches, converting the physical signal into a first digital signal, the router routes the first digital signal to a transceiver other than the first transceiver among the plurality of transceivers, unless a no-transfer condition is satisfied, the transceiver other than the first transceiver converts the first digital signal routed into a physical signal, and transmits the physical signal to a bus of a branch other than the first branch among the plurality of branches, and the no-transfer condition includes: a first condition that one of the first branch and the first transceiver does not follow the predetermined rule; and a second condition that the router is routing a second digital signal to a branch other than a second branch among the plurality of branches in a current time slot, the second digital signal being generated by converting a physical signal received from the second branch into the second digital signal.

Thus, even if the anomalous frame is transmitted from the branch that does not match the routing rule, the secure star coupler prevents the transfer of this frame to another branch. This enhances the safety of the communication network.

It is possible that the secure star coupler further includes a communication controller that communicates with the at least one communication device, wherein the communication controller decodes and interprets the first digital signal as a frame, and includes a received-frame information holder that holds received-frame information in which information about the frame is associated with an identifier indicating one of the first branch and the first transceiver that is a transfer source of the first digital signal, and the communication controller notifies the at least one communication device of the received-frame information.

This enables the external device of the secure star coupler to easily determine the branch that transmitted the frame received by the secure star coupler. Thus, the source of the anomalous frame can be easily identified.

It is also possible that the secure star coupler further includes a branch anomaly-level holder that holds an anomaly level for each of the plurality of branches, wherein when a third digital signal received from a third transceiver among the plurality of transceivers does not follow the predetermined rule, the router increases an anomaly level of a third branch connected to the third transceiver among the plurality of branches, the third digital signal being generated by the third transceiver converting a physical signal into the third digital signal, and when the anomaly level of the third branch is greater than or equal to a predetermined value, the router does not transfer the third digital signal to a transceiver other than the third transceiver among the plurality of transceivers.

This can prevent the frame transfer from the branch that is iteratively determined as transmitting the anomalous frame.

It is further possible that the router detects whether the frame has an error in a communication protocol used for the communication network, and increases the anomaly level of the third branch when the router detects that the frame has an error in the communication protocol and the third digital signal received from the third transceiver follows the predetermined rule.

This maintains the safety of the in-vehicle network by executing the transfer that follows the routing rule. In addition to this, because the branch that is likely to attempt the transmission of an anomalous frame is identified, the transfer of the frame transmitted from this branch can be inhibited.

It is still further possible that the secure star coupler further includes an anomaly reference list holder that holds an anomaly reference list indicating whether or not a correspondence between a time slot and a value of a payload included in a frame is appropriate, wherein the router performs verification of a frame obtained by interpreting a digital signal against the anomaly reference list, before completion of transfer of the digital signal, and the router stops the transfer of the digital signal before the completion of the transfer when the router determines that the correspondence is not appropriate as a result of the verification.

Thus, even if the anomalous frame matches the routing rule, the detection of the payload included in this frame can prevent the transfer of this frame.

It is still further possible that the communication network is an in-vehicle network, the secure star coupler further comprises a vehicle status holder that holds vehicle information indicating a status of a vehicle including the in-vehicle network, the communication controller updates the vehicle information using information received from the at least one communication device, and the router stops the transfer of the digital signal before the completion of the transfer when the router determines that the correspondence is not appropriate as a result of the verification and the status of the vehicle indicated by the vehicle information satisfies a predetermined condition.

Thus, if the communication network is an in-vehicle network, whether to prohibit the transfer of the anomalous frame depends on the vehicle status, like the moving state. This prevents the anomalous frame from adversely affecting the running safety in a situation dangerous for the driver. Moreover, intervention in the in-vehicle network system in a safe situation can keep the advanced features from being disabled.

According to another aspect of the present disclosure, a frame transfer method used in a communication network adopting a time-triggered protocol based on a time slot, the communication network including a plurality of branches which are connected to each other via a secure star coupler and each of which includes a bus and at least one communication device, the at least one communication device transmitting and receiving a frame in a corresponding predetermined time slot, the frame transfer method, comprising: holding a predetermined rule indicating a correspondence between a time slot and a transmission source branch, the transmission source branch being a branch among the plurality of branches and transmitting a physical signal to be transferred by the secure star coupler in the time slot; converting a physical signal received from a bus of a first branch among the plurality of branches into a first digital signal; routing the first digital signal to a branch other than the first branch among the plurality of branches unless a no-transfer condition is satisfied; and converting the first digital signal routed in the routing into a physical signal, and transmitting the physical signal to a bus of the branch other than the first branch, wherein the no-transfer condition includes: a first condition that the first branch does not follow the predetermined rule; and a second condition that a second digital signal is being routed to a branch other than a second branch among the plurality of branches in a current time slot, the second digital signal being generated by converting a physical signal received from the second branch into the second digital signal, the second branch being different from the first branch.

Thus, even if the anomalous frame is transmitted from the branch that does not match the routing rule, the secure star coupler prevents the transfer of this frame to another branch. This enhances the safety of the communication network.

The following describes the secure star couplers according to the embodiments of the present disclosure with reference to the Drawings. The embodiments below are general or specific examples. The numerical values, elements, arrangement and connection configuration of the elements, steps, the order of the steps, etc., described in the following embodiments are merely examples, and are not intended to limit the present disclosure. Note that the respective figures are schematic diagrams and are not necessarily precise illustrations.

Embodiment 1

1. System Configuration

As an example according to the present disclosure, the present embodiment describes a secure star coupler and an anomaly detection ECU with reference to the drawings. The secure star coupler and the anomaly detection ECU monitor a star topology in-vehicle network and detect transmission of an anomalous frame on the basis of information indicating a transmitted or received frame and a branch that is a transmission source of the frame. The secure star coupler and the anomaly detection ECU may also prevent the transfer of the anomalous frame.

[1.1 Overall Configuration of In-Vehicle Network System]

FIG. 1 is a block diagram illustrating an example of an overall configuration of in-vehicle network system 10 according to the present disclosure. In-vehicle network system 10 includes: buses 100a, 100b, 100c, and 100d used for communications established under a FlexRay protocol; ECUs 200a, 200b, 200c, and 200d each connected to a corresponding one of the aforementioned buses; steering 210, gear 220, brake 230, and camera 240 each controlled by a corresponding one of the aforementioned ECUs; secure star coupler 300 that connects the aforementioned buses to each other; and anomaly detection ECU 310 connected to secure star coupler 300 via communication line 110. ECUs 200a to 200d control a vehicle by transmitting and receiving frames via buses 100a to 100d. Anomaly detection ECU 310 observes buses 100a to 100d via secure star coupler 300 to detect an anomalous frame occurring in in-vehicle network system 10. Each of ECUs 200a to 200d and anomaly detection ECU 310 is an example of a communication device according to the present embodiment. Secure star coupler 300 performs signal shaping and the ECUs are synchronized with each other via buses 100a to 100d so that the same signal passes through buses 100a to 100d. Each of the buses and ECUs connected to the buses is also referred to as a branch in the present disclosure. As an example of an identifier of the branch including the bus, a character string that is the same as the reference mark of the bus may be used for the sake of simplicity.

[1.2 FlexRay Cycle]

For FlexRay communications, a periodic operation called a cycle that includes four segments is repeated. Each of the nodes included in one whole FlexRay network, also called a cluster, achieves synchronous communications by calculating and correcting a difference between its unique local time and a global time indicating a time duration and start time of the cycle.

Figure 2:
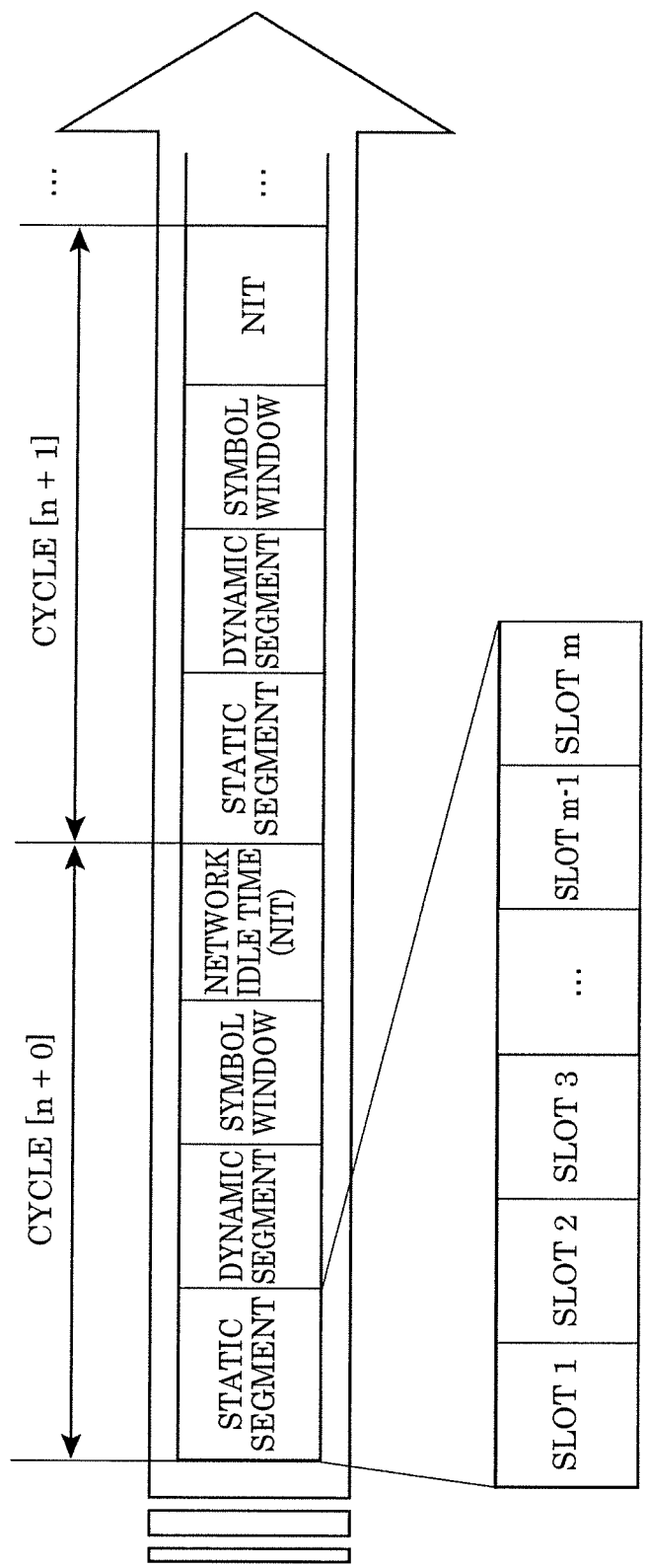
FIG. 2 illustrates a FlexRay cycle according to Embodiments 1 and 2.

FIG. 2 illustrates a FlexRay communication cycle. FlexRay communications are achieved by repetition of this cycle. Each of the nodes stores a cycle count (the number of repeated cycles) in synchronization. A value of the cycle count, "n+0" and "n+1" in FIG. 2, is incremented by one at a time from 0 to 63. When 63 is reached, the cycle count is reset to 0.

One cycle includes four segments, which are a static segment, a dynamic segment, a symbol window, and a network idle time (NIT). Time durations of these segments are predetermined by parameters in one cluster, and thus all cycles in one cluster have the same time duration. Note that the dynamic segment and the symbol window are optional. The node transmits frames in the static segment and in the dynamic segment. Each of the static segment and the dynamic segment has a fixed time unit called a time slot or a slot, during which one frame is allowed to be transmitted.

The static segment includes a plurality of slots. Each cycle starts with the static segment. All the static segments in one cluster have the same number of slots, and all the slots in one cluster have the same duration. Each of the slots is assigned a number (a slot number) that is one greater than the number of the previous slot in sequence. A frame transmitted in the slot is assigned this slot number as a frame identifier hereinafter, also referred to as a frame ID. A slot in the static segment is also referred to as a static slot or a static time slot. A frame transmitted in the static segment is also referred to as a static frame. A predetermined ECU always transmits a frame in the static slot in a predetermined cycle. All static frames in one cluster have the same payload length.

The dynamic segment includes slots called minislots, and is placed after the static segment in each cycle. Note that the dynamic segment is not essential as described above. As with the slots in the static segment, each of the minislots is also assigned a number (a slot number) that is one greater than the number of the previous minislot in sequence. Although a timing (minislot) of transmitting a frame is predetermined for each of the ECUs, the ECU does not need to transmit a frame in each predetermined cycle unlike in the static segment. A slot in the dynamic segment is also referred to as a dynamic slot or a dynamic time slot. A frame transmitted in the dynamic segment is also referred to as a dynamic frame. A payload length of a dynamic frame can be any value from 0 to 254. To be more specific, the length of the dynamic slot is variable.

The symbol window is a time period in which a signal called a symbol is transmitted and received.

The network idle time is a communication-free period, and is always provided at the end of the cycle. In the network idle time, the ECU performs no data transmission and performs, for example, a synchronous process. Thus, the network is literally in an idle state.

The FlexRay protocol uses no identifier indicating a transmission destination or transmission source. A transmitter node transmits a frame containing predetermined content to the bus at a transmission timing (slot) predetermined as described above. A receiver node receives the frame from the bus only at a predetermined reception timing (slot). Moreover, a method called "cycle multiplexing" is also used to achieve communications of frames having different contents in different cycles even in the slots having the same number in the static or dynamic segment.

Furthermore, the FlexRay protocol enables the design of a communication network based on not only a bus network topology in which all nodes are connected to a single bus as in CAN, but also a star network topology achieved via a star coupler or a hybrid network topology that is a combination of the bus and star topologies.

[1.3 Frame Format]

Figure 3:
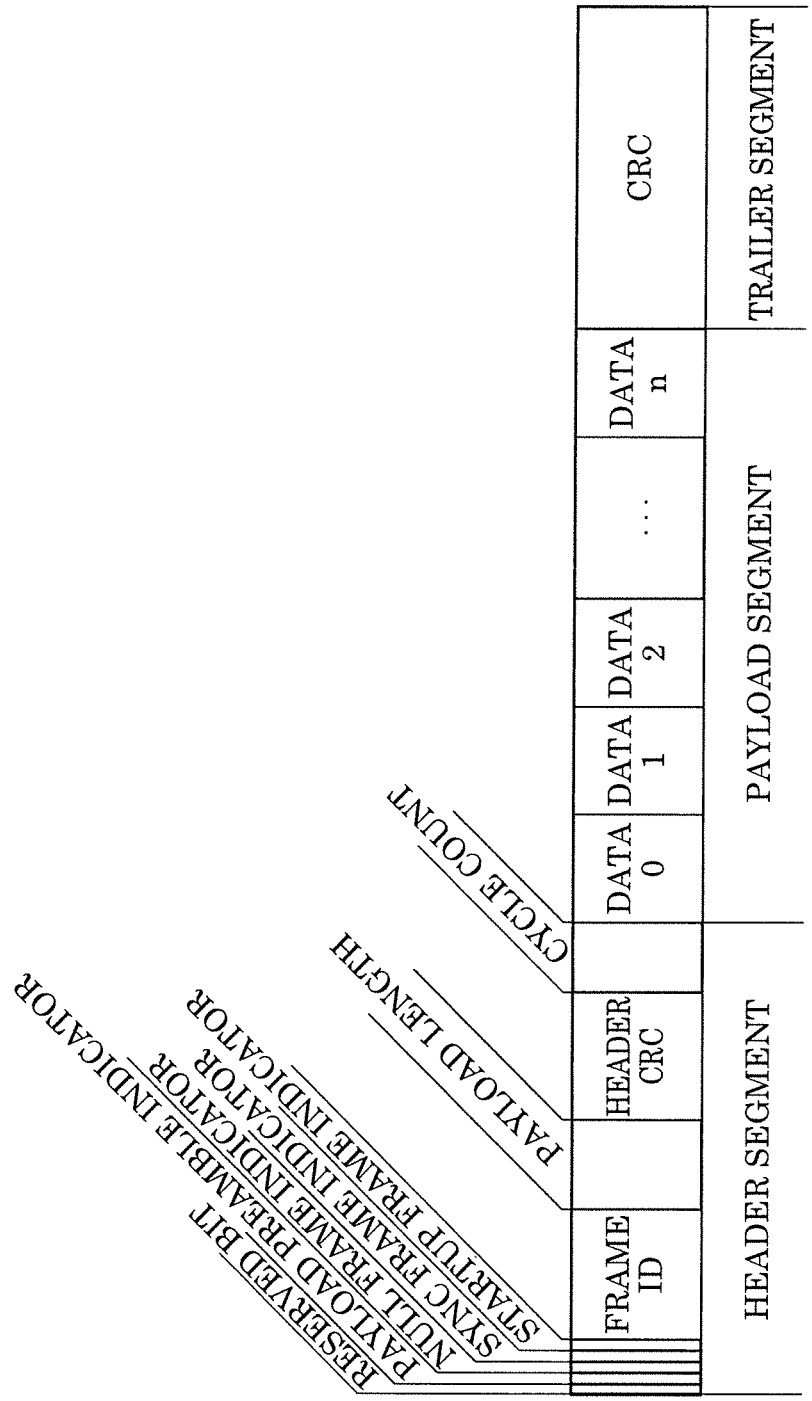
FIG. 3 illustrates a FlexRay frame format according to Embodiments 1 and 2.

FIG. 3 illustrates a frame format based on the FlexRay protocol. This format is shared by both the static frame and the dynamic frame. The frame includes three segments, which are a header segment, a payload segment, and a trailer segment. In the present disclosure, these segments may also be referred to as the header, the payload, and the trailer.

The header segment starts with a reserved bit, which is followed by, as meta information about an attribute (type) of the frame, a payload preamble indicator, a null frame indicator, a sync frame indicator, and a startup frame indicator each having one bit. After this, a frame ID having 11 bits, a payload length having 7 bits, and a header CRC having 11 bits follow. At the end, a cycle count having 6 bits is included.

The frame ID matches the slot number described above and thus also referred to as the slot ID. The frame ID is used to identify the transmission timing of the frame in the static or dynamic segment and the frame type based on the content of the frame.

The payload length indicates a length of the payload of the frame, and is up to 127. The payload segment stores data corresponding to the number of bytes obtained by multiplying the value of the payload length by 2.

The header CRC is a cyclic redundancy check (CRC) calculated using the values in the fields from the sync frame indicator to the payload length.

The current cycle stores a value, from 0 to 63, indicating the number of the current cycle in repeated cycles in the cluster.

The payload segment includes a data body of the frame and contains up to 254 bytes.

The trailer segment stores a CRC calculated using the values of the fields including the header and the whole payload.

[1.4 Configuration of ECU (Other than Anomaly Detection ECU)]

Figure 4:
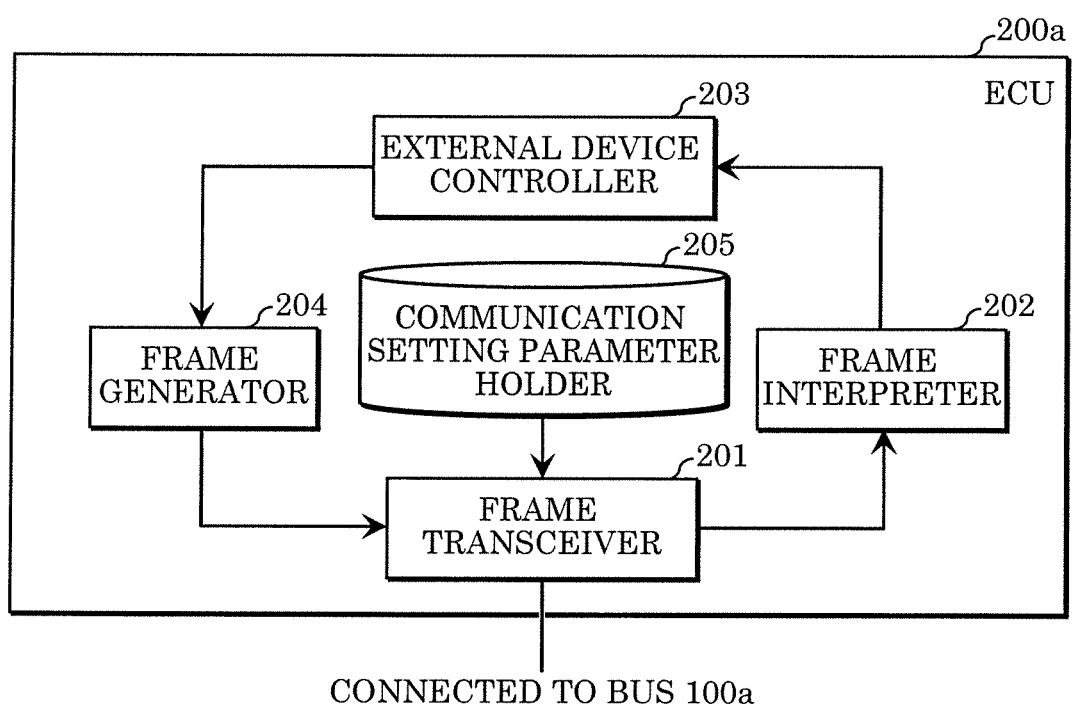
FIG. 4 is a block diagram illustrating a functional configuration of an ECU according to Embodiments 1 and 2.

FIG. 4 is a block diagram illustrating an example of a functional configuration of ECU 200a. Here, ECU 200b, ECU 200c, and ECU 200d may also have the same configuration as that of ECU 200a, and thus description on ECUs 200b to 200d is omitted.

ECU 200a includes frame transceiver 201, frame interpreter 202, external device controller 203, frame generator 204, and communication setting parameter holder 205. Note that ECU 200a is provided with a microcontroller including a processor and a memory, and that the aforementioned components included in ECU 200a are functional components implemented by the processor executing one or more programs stored in the memory. Each of ECUs 200b, ECU 200c, and ECU 200d is configured in the same manner as ECU 200a.

Frame transceiver 201 converts a physical signal received from bus 100a into a digital signal to obtain data of a frame (reception of a frame). Frame transceiver 201 is capable of properly receiving a frame transmitted from another ECU by synchronizing to this other ECU included in in-vehicle network system 10, by reference to communication setting parameters held in communication setting parameter holder 205. In response to a frame transmission request from frame generator 204, frame transceiver 201 converts a frame into a physical signal and transmits this physical signal to bus 100a at a predetermined timing i.e. a predetermined slot (transmission of a frame).

Frame interpreter 202 interprets a payload of the frame received from frame transceiver 201 and, on the basis of content of the payload, provides notification instructing external device controller 203 to control steering 210 connected to ECU 200a. In response to this notification, assist control of the steering is achieved in accordance with a moving status determined by frame interpreter 202 on the basis of information about a speed of the vehicle notified by another ECU, for example. As another example, automatic steering is performed in an automatic parking mode in response to a steering operation instruction signal received from an automatic parking ECU, which is not illustrated.

External device controller 203 controls steering 210 connected to ECU 200a. Moreover, external device controller 203 monitors a status of steering 210 and requests frame generator 204 for frame transmission to notify another ECU of the status. The status of steering 210 indicates a steering angle of steering 210, for example.

In response to the request from external device controller 203, frame generator 204 generates a frame and requests frame transceiver 201 to transmit this frame.

Communication setting parameter holder 205 holds parameters used for correctly converting a physical signal received from bus 100a into a digital signal. The parameters are shared in in-vehicle network system 10. Thus, the same parameters are stored in the other ECUs. The communication setting parameters are described in detail later, with reference to an example illustrated in FIG. 7.

[1.5 Configuration of Secure Star Coupler]

Figure 5:
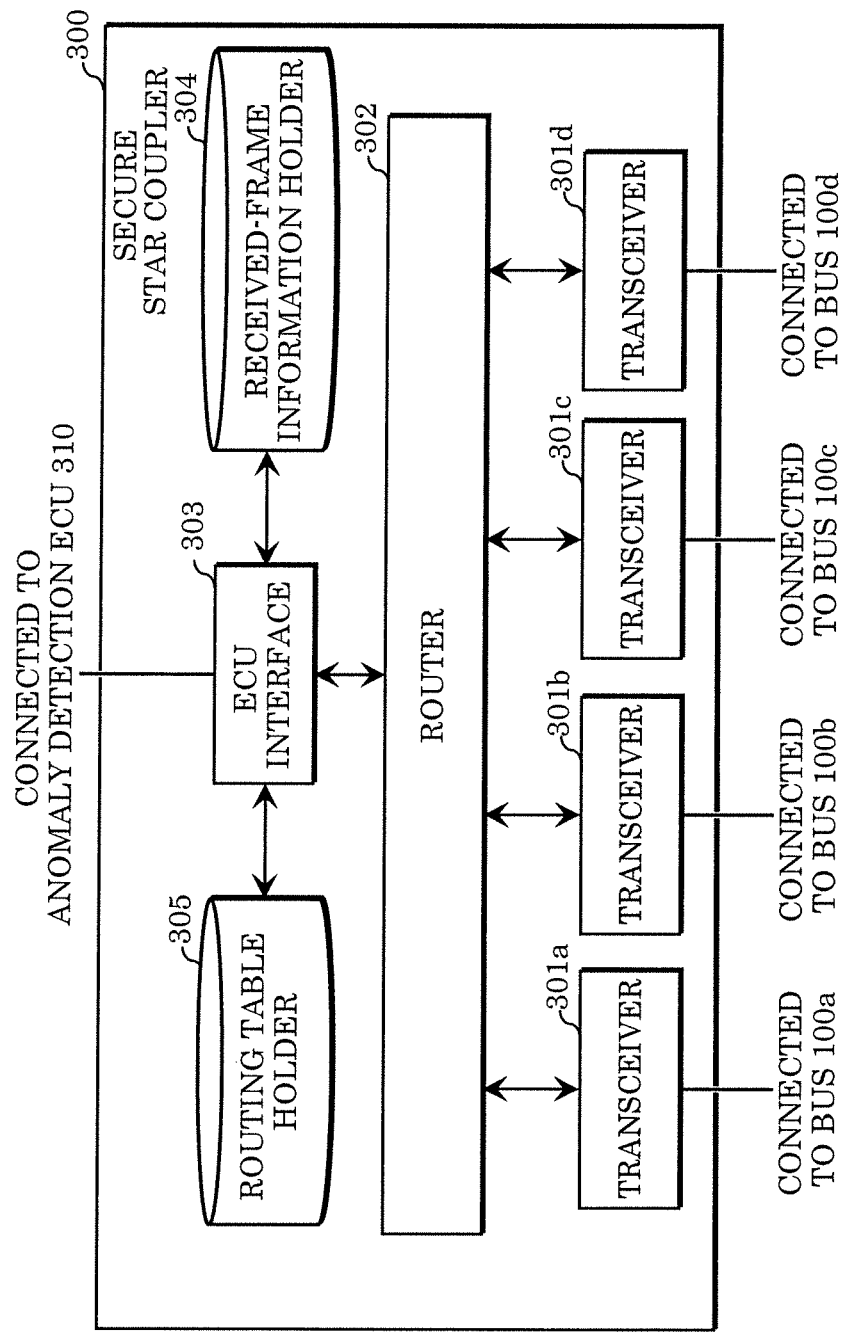
FIG. 5 is a block diagram illustrating an example of a configuration of a secure star coupler according to Embodiment 1.

FIG. 5 illustrates an example of a configuration of secure star coupler 300. Secure star coupler 300 includes transceivers 301a, 301b, 301c, and 301d, router 302, ECU interface 303, received-frame information holder 304, and routing table holder 305.

Transceiver 301a, which is connected to bus 100a, converts a physical signal received from bus 100a into a digital signal and then notifies router 302 of this digital signal. Moreover, transceiver 301a converts a digital signal notified by router 302 into a physical signal and then transmits this physical signal to bus 100a. Similarly, transceiver 301b, transceiver 301c, and transceiver 301d are connected to bus 100b, bus 100c, and bus 100d, respectively. Each of transceivers 301b to 301d performs the same operation performed by transceiver 301a on a physical signal received from the bus connected.

Router 302 routes the digital signal notified by transceiver 301a to the transceivers except for transceiver 301a, that is, to transceivers 301b, 301c, and 301d. Similarly, router 302 routes the digital signal notified by transceiver 301b to the transceivers except for transceiver 301b. Moreover, router 302 notifies ECU interface 303 of the digital signal, which is currently being routed, and information indicating a branch from which this digital signal is being received. This information is referred to as the reception branch information. Furthermore, in response to an instruction received from ECU interface 303, router 302 sets a correspondence between a slot number (slot ID) and a transmission source branch (or, the transceiver connected to this transmission source branch) that transmits the signal to be transferred in a time slot indicated by this slot number, on the basis of a routing table stored in routing table holder 305. Router 302 routes the signal received from the corresponding transmission source branch set in the time slot having the slot number, to another branch. Router 302 ignores a signal received from a branch having no correspondence with the slot number. More specifically, secure star coupler 300 does not transfer such a signal to any other branch. In a time slot in which no correspondence is set between a slot number and a transmission source branch, router 302 routes a first received signal to a branch other than the branch from which this signal was transmitted. Here, a branch and a transceiver are connected to each other via the bus connected to this transceiver. Thus, specifying one of these two is the same as specifying the other. Based on this correspondence relationship, instead of stating that "router 302 routes a signal to the transceiver connected to (the bus of) the branch", the present disclosure may state that "router 302 routes a signal to the branch" and vice versa. Moreover, a branch that is the transmission source of the signal may be specified by the name of the transceiver connected to (the bus of) this branch.

When notified of the digital signal and the reception branch information by router 302, ECU interface 303 decodes and interprets this digital signal as a received frame. Then, ECU interface 303 stores information about this received frame in association with the reception branch information into received-frame information holder 304. Moreover, in response to a request from anomaly detection ECU 310, ECU interface 303 notifies anomaly detection ECU 310 of the received-frame information and the reception branch information stored in received-frame information holder 304. Furthermore, ECU interface 303 interprets an instruction from anomaly detection ECU 310. With this interpretation, ECU interface 303 rewrites the routing table stored in routing table holder 305 and indicating the transmission source branch of the signal to be transferred in the slot, and reflects this rewritten setting in the control of router 302.

Received-frame information holder 304 holds the aforementioned information about the received frame in association with the reception branch information. FIG. 8 illustrates an example of the information about the received frame stored in received-frame information holder 304. In each row in this example, an identifier (100, 100a, and 100c in this diagram) is associated with the information about the received frame based on the signal received from the branch. Note that information in which the information about the received frame is associated with the reception branch information in this way is also referred to as the received-frame information, according to the present disclosure. The received-frame information is described in detail later, with reference to the example illustrated in FIG. 8.

Routing table holder 305 stores a table indicating a transmission source branch that transmits a signal to be transferred in the slot. FIG. 9 illustrates an example of a routing table stored in routing table holder 305. The routing table is described in detail later, with reference to this example illustrated in FIG. 9.

[1.6 Configuration of Anomaly Detection ECU 310]

Figures 6, 7:
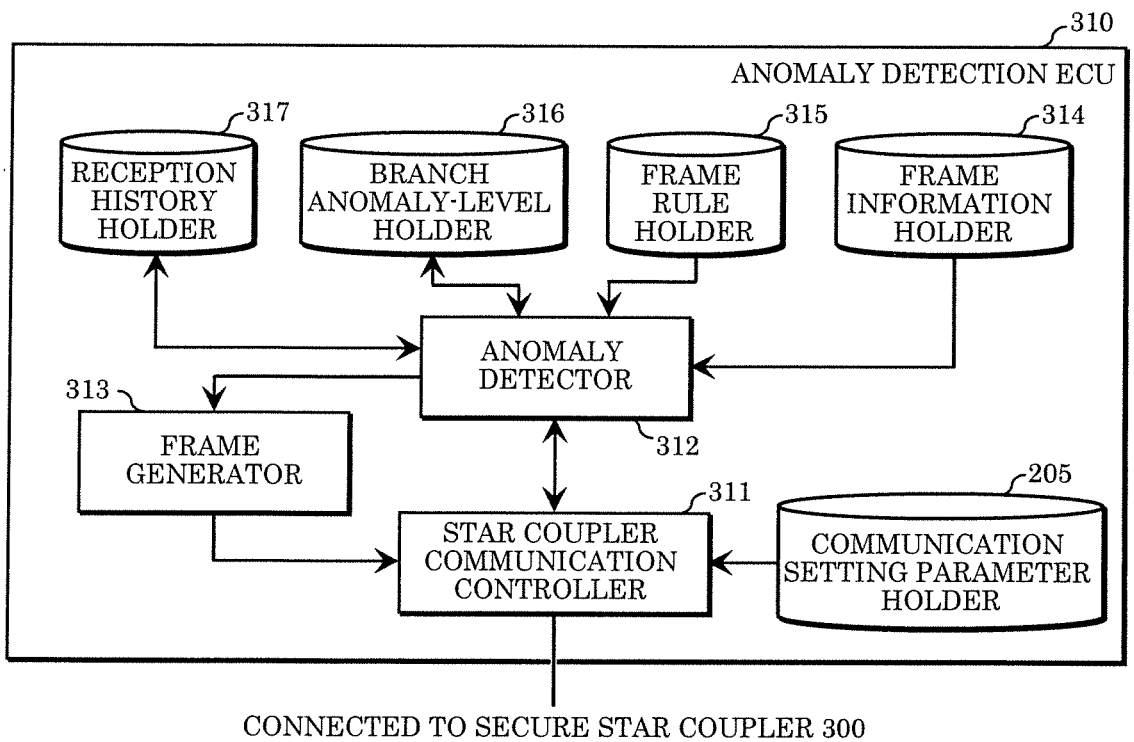
FIG. 6 is a block diagram illustrating an example of a functional configuration of an anomaly detection ECU according to Embodiment 1.
FIG. 7 illustrates an example of communication setting parameters stored in a communication setting parameter holder according to Embodiments 1 and 2.

FIG. 6 is a block diagram illustrating an example of a functional configuration of anomaly detection ECU 310.

Anomaly detection ECU 310 includes star coupler communication controller 311, anomaly detector 312, frame generator 313, communication setting parameter holder 205, frame information holder 314, frame rule holder 315, branch anomaly-level holder 316, and reception history holder 317. Here, a component that is the same as that included in ECU 200a is assigned the same reference mark used in ECU 200a, and description on this component is omitted. Note that anomaly detection ECU 310 is also provided with a microcontroller including a processor and a memory, and that the aforementioned components included in anomaly detection ECU 310 are functional components implemented by the processor executing one or more programs stored in the memory.

Star coupler communication controller 311 is a communication interface with secure star coupler 300, and configures setting for secure star coupler 300 on the basis of the communication setting parameters stored in communication setting parameter holder 205. The setting for secure star coupler 300 may include routing control information based on the table indicating the correspondence between the slot and the transmission source branch. Star coupler communication controller 311 receives the aforementioned received-frame information, which is the information about the received frame received by secure star coupler 300, from secure star coupler 300 and notifies anomaly detector 312 of this information. In response to the frame transmission request from frame generator 313, star coupler communication controller 311 notifies secure star coupler 300 of the content of this frame.

On the basis of the received-frame information including the reception branch information notified by star coupler communication controller 311, anomaly detector 312 determines whether the received frame is anomalous. For this determination, anomaly detector 312 first determines whether the correspondence between the frame ID of the actual received frame and the reception branch is correct, by reference to the table stored in frame information holder 314 and indicating the correspondence between the slot ID and the transmission source branch. If the correspondence between the frame ID of the received frame and the reception branch is correct, anomaly detector 312 further refers to a rule stored in frame rule holder 315 for each type of content of the payload of the received frame and to a reception history held in reception history holder 317. With this reference, anomaly detector 312 determines the received frame to be anomalous if the content of the payload of this received frame does not match the rule. If determining that the received frame is anomalous, anomaly detector 312 further requests frame generator 313 for frame transmission to notify the other ECUs that an anomalous frame has been transmitted. In addition, among anomaly-levels of the branches stored in branch anomaly-level holder 316, anomaly detector 312 increases the value of the branch that transmitted the anomalous frame. Moreover, to prevent the transfer of an anomalous frame from this branch to another branch from then on, anomaly detector 312 instructs, via star coupler communication controller 311, ECU interface 303 of secure star coupler 300 to rewrite the routing table and reflect this rewritten setting in the control of router 302.

Frame information holder 314 stores frame information including an ID of a frame or a slot)transmitted from the ECU and the transmission source branch. FIG. 10 illustrates an example of the frame information stored in frame information holder 314. The frame information is described in detail later.

Frame rule holder 315 stores rules used by anomaly detector 312 to determine whether the received frame is anomalous. FIG. 11 illustrates an example of frame rules stored in frame rule holder 315. The frame rules are described in detail later.

Branch anomaly-level holder 316 stores an anomaly level for each branch based on the number of anomalous-frame receptions. FIG. 12 illustrates an example of branch anomaly levels stored in branch anomaly-level holder 316. The branch anomaly levels are described in detail later.

Reception history holder 317 stores the information about the received frame, such as a value indicated by the payload, meta information including a frame attribute, and the number of frame receptions. FIG. 13 illustrates an example of a reception history stored in reception history holder 317. The reception history is described in detail later.

[1.7 Communication Setting Parameters]

FIG. 7 illustrates an example of the communication setting parameters stored in communication setting parameter holder 205. The communication setting parameters are defined as follows: the data transfer speed is 10 Mbps; the slot ID of the static segment or more specifically, the frame ID of the frame transmitted and received in the slot is one of 1 to 50; the slot ID of the dynamic segment similarly, the frame ID is one of 51 to 100; and the payload length of the static frame is 8 that is, 16 bytes. These parameter values are shared by all the ECUs in the cluster. Transmission and reception of FlexRay frames are implemented on the basis of these parameter values. The values of the communication setting parameters illustrated in FIG. 7 are merely examples and thus different values may be used. The aforementioned communication setting parameters are also merely examples. Parameters that are not in FIG. 7 such as the segment length or the slot length may be included. In other words, not all the parameters in FIG. 7 are essential.

[1.8 Received-Frame Information]

FIG. 8 illustrates an example of the received-frame information stored in received-frame information holder 304 included in secure star coupler 300.

In the example illustrated in FIG. 8, received-frame information items are stored in descending order in list form, the latest information being at the top of the list. For each frame received by secure star coupler 300, the information about the received frame includes: a reception branch indicating information about the branch from which the frame was received; an ID of the time slot (reception slot ID) where the signal indicating the received frame was received; a cycle count; a payload length; data included in the payload; a flag status of a payload preamble indicator; and an error flag indicating whether the frame has been received properly.

[1.9 Routing Table]

FIG. 9 illustrates an example of the routing table stored in routing table holder 305 included in secure star coupler 300.

Each row of the routing table illustrated in FIG. 9 indicates: a specific timing determined by a combination of a slot ID, a cycle offset, and a cycle reception; and a rule defining a transmission source branch that transmits the signal to be transferred at this timing. This rule may also be referred to as the routing rule. For example, a first row indicates that the identifier of the transmission source branch is 100c at the timing where the slot ID is 1, the cycle offset is 0, and the cycle reception is 1. If receiving the signal from the bus (100c) of the branch indicated by this identifier at this timing, router 302 routes this signal to another branch. Here, if receiving a signal from a bus other than bus 100c at this timing, router 302 ignores this signal (i.e., does not route this signal). Similarly, a rule in a second row indicates the identifier of the transmission source branch is 100a at the timing where the slot ID is 3, the cycle offset is 0, and the cycle reception is 2. Moreover, a rule in a third row indicates the identifier of the transmission source branch is 100b at the timing where the slot ID is 99, the cycle offset is 1, and the cycle reception is 2. Routing table holder 305 holding the routing table indicating these routing rules is an example of a routing rule holder according to the present embodiment.

[1.10 Frame Information]

FIG. 10 illustrates an example of the frame information stored in frame information holder 314 included in anomaly detection ECU 310.

Each row of the table illustrated as an example in FIG. 10 stores frame information about one frame and includes: a slot ID, a cycle offset, a cycle reception, a frame name, and an information type indicated by the payload included in the frame. The cycle offset and the cycle reception are information items required to extract a target frame when a method called "cycle multiplexing" is used. By this method, frames having the same slot ID but different data contents (types) are transmitted and received in different cycles. For example, four frames with the frame names D, E, F, and G have the same slot ID 99. These four frames include payloads containing different contents, which are camera information 1, camera information 2, camera information 3, and camera information 4. These frames are transmitted and received in different cycles.

For example, the cycle offset is 0 and the cycle reception is 4 for camera information 1. This indicates that transmission of frame D having the payload containing the data of camera information 1 starts from the cycle having the number of repeated cycles 0 and is executed every four cycles. More specifically, frame D is transmitted in the slot having the slot ID as 99 in each of the cycles having the number of repeated cycles 0, 4, 8, 12, 16, . . . , 52, 56, and 60. Similarly, frame E containing camera information 2 is transmitted in the slot having the slot ID 99 in each of the cycles having the number of repeated cycles 1, 5, 9, . . . , 53, 57, and 61. Frame F containing camera information 3 is transmitted in the slot having the slot ID 99 in each of the cycles with the number of repeated cycles 2, 6, 10, . . . , 54, 58, and 62. Frame G containing camera information 4 is transmitted in the slot having the slot ID 99 in each of the cycles with the number of repeated cycles 3, 7, 11, . . . , 55, 59, and 63. In this way, cycle multiplexing enables the frames having the different contents to be transmitted in the slots having the same slot ID in the different cycles.

The frame information further includes information indicating a transmission source ECU and a branch connected to the transmission source ECU. The transmission source ECU is the design transmission source of this frame in in-vehicle network system 10. Such frame information indicates, so to speak, a schedule of transmission and reception of the frame in in-vehicle network system 10.

The content of the frame information illustrated as an example in FIG. 10 is described in more detail.

A first row of the table in FIG. 10 indicates that, in a slot having the slot ID 1, a frame having frame name A is transmitted according to a schedule in which the cycle offset is 0 and the cycle reception is 1 or more specifically, the frame containing the fixed data is transmitted in all the cycles. The first row also indicates that: content of the payload of frame A, that is, information indicated by the payload is about a speed; the transmission source ECU is 200c; and the branch is 100c. A second row of the table indicates that no frame is transmitted in a slot having the slot ID 2. A third row of the table indicates that, in a slot having the slot ID 3, a frame having frame name B is transmitted according to a schedule in which the cycle offset is 0 and the cycle reception is 2 or more specifically, the frame is transmitted only in the cycles with even number of repeated cycles. The third row also indicates that: information indicated by the payload of frame B is about a steering angle; the transmission source ECU is 200a; and the branch is 100a. A next row of the table indicates that, in a slot having the slot ID 98, a frame having frame name C is transmitted according to a schedule in which the cycle offset is 1 and the cycle reception is 2 or more specifically, the frame is transmitted only in cycles with odd number of repeated cycles. This row also indicates that: information indicated by the payload of frame C is about a gear status indicating a position of a shift lever or a position of a selector; the transmission source ECU is 200b; and the branch is 100b. A next row indicates that, in a slot having the slot ID 99, a frame having frame name D is transmitted according to a schedule in which the cycle offset is 0 and the cycle reception is 4. This row also indicates that: information indicated by the payload of frame D is predetermined information referred to as camera information 1; the transmission source ECU is 200d; and the branch is 100d. A next row indicates that, in a slot having the slot ID 99, a frame having frame name E is transmitted according to a schedule in which the cycle offset is 1 and the cycle reception is 4. This row also indicates that: information indicated by the payload of frame E is predetermined information referred to as camera information 2; the transmission source ECU is 200d; and the branch is 100d. A next row indicates that, in a slot having the slot ID 99, a frame having frame name F is transmitted according to a schedule in which the cycle offset is 2 and the cycle reception is 4. This row also indicates that: information indicated by the payload of frame F is predetermined information referred to as camera information 3; the transmission source ECU is 200d; and the branch is 100d. A bottom row indicates that, in a slot having the slot ID 99, a frame having frame name G is transmitted according to a schedule in which the cycle offset is 3 and the cycle reception is 4. This row also indicates that: information indicated by the payload of frame G is predetermined information referred to as camera information 4; the transmission source ECU is 200*d*; and the branch is 100*d*. By reference to the IDs included among the communication setting parameters in FIG. 7, frames A and B are static frames transmitted in static segments whereas frames C to G are dynamic frames transmitted in dynamic segments.

[1.11 Frame Rule]

FIG. 11 illustrates an example of frame rules stored in frame rule holder 315 included in anomaly detection ECU 310. Each row of the table illustrated as an example in FIG. 11 stores a reception rule for each frame type specified by a frame name.

Frame A has a payload length fixed to 8. As a reception rule for frame A, if a difference between a speed indicated by the payload of frame A received this time and a speed indicated by frame A received last time is 0.5 km/h or greater, this frame is determined to be anomalous. Frame B has a payload length fixed to 8. As a reception rule for frame B, if an angular difference between a steering angle indicated by the payload of frame B received this time and a steering angle indicated by the payload of frame B received last time is 30 degrees or greater, this frame is determined to be anomalous.

Note that anomaly detection ECU 310 may determine whether the received frame is anomalous on the basis of not only whether the received frame matches the reception rule, but also whether the payload length of the received frame is correct.

[1.12 Branch Anomaly Level]

FIG. 12 illustrates an example of branch anomaly levels stored in branch anomaly-level holder 316 included in anomaly detection ECU 310. In the example illustrated in FIG. 12, each row of a table stores an anomaly level of a branch. Whenever an anomalous frame, which is determined as such based on a result of determination made by anomaly detector 312, is received, the anomaly level of the branch that is the transmission source of this frame is increased by 1. The example in FIG. 12 illustrates that: the anomaly level of the branch identified by the identifier "100*a*" is 0; the anomaly level of the branch identified by the identifier "100*b*" is 0; the anomaly level of the branch identified by the identifier "100*c*" is 0; and the anomaly level of the branch identified by the identifier "100*d*" is 20.

[1.13 Reception History]

FIG. 13 illustrates an example of a reception history stored in reception history holder 317 in anomaly detection ECU 310. In the example illustrated in FIG. 13, a table stores a vehicle status and a previous reception value that is indicated by a payload, for each frame type specified by a frame name. The previous reception value is stored in association with a reception time (µs). This example illustrates that the previous reception value of frame A indicating the speed of the vehicle is 40.5 km/h, and that the previous reception time is 12100 µs. The previous reception value of frame B indicating the steering angle is 5 degrees, and the previous reception time is 8140 µs. The previous reception value of frame C indicating the gear status indicates a driving state, and the previous reception time is 12400 µs. The previous reception value of frame D indicating camera information 1 indicates detection of a vehicle ahead, and the previous reception time is 1440 µs. The previous reception value of frame E indicating camera information 2 indicates detection of a pedestrian, and the previous reception time is 5480 µs. The previous reception value of frame F indicating camera information 3 indicates a lane detection state, and the previous reception time is 9520 µs. The previous reception value of frame G indicating camera information 4 indicates detection of an inactive state of a rear camera, and the previous reception time is 13560 µs. When the speed of the vehicle indicated by frame A is more than 0 km/h, the information about the vehicle status is updated to "moving". When the speed is 0 km/h, this information is updated to "stopped". Note that each of the aforementioned previous reception values is updated by anomaly detector 312 whenever the corresponding frame is received, for example.

Although stored in this example, the reception times are not essential. The reception time is expressed in µs to indicate a period of time elapsed from a predetermined reference time. However, any time unit may be used. For example, the number of microticks calculated from an internal clock used in the FlexRay protocol and the number of macroticks defined using microticks may be used.

[1.14 Operation Performed by Secure Star Coupler]

Next, an operation procedure performed using the information and rules by secure star coupler 300 included in in-vehicle network system 10 configured as described above is described with reference to an example. Note that the operation performed by secure star coupler 300 is achieved by the components of secure star coupler 300 that execute processes. Thus, the following description on the processes performed by the components of secure star coupler 300 can also be understood as description on the operation performed by secure star coupler 300.

Figure 14:
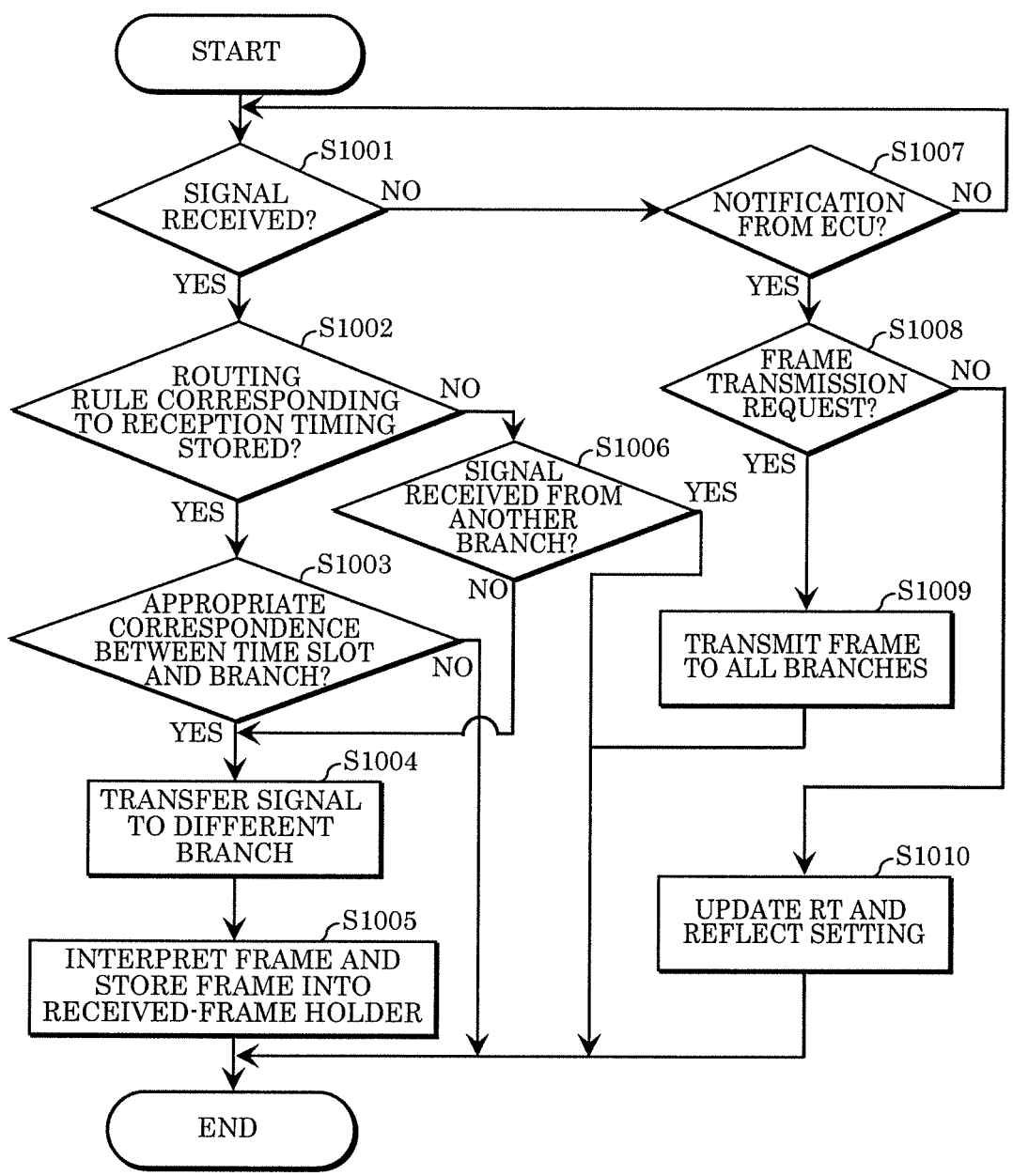
FIG. 14 is a flowchart of an example of an operation procedure performed by the secure star coupler according to Embodiment 1.

FIG. 14 is a flowchart of an example of the operation procedure performed by secure star coupler 300.

Router 302 of secure star coupler 300 determines whether any of transceivers 301*a* to 301*d* is receiving a signal from any of the branches (S1001). If the signal is being received (Yes in S1001), router 302 determines whether the routing table stored in routing table holder 305 includes a routing rule corresponding to the current timing (slot) where this signal is being received (S1002). If the table includes the corresponding routing rule (Yes in S1002), router 302 verifies, by reference to this routing rule, whether the slot where the signal is received has an appropriate correspondence with the branch that transmitted this signal (S1003). If no corresponding routing rule is stored (No in S1002), router 302 verifies whether a signal is being received from another branch (S1006).

If the correspondence between the slot where the frame is received and the branch that transmitted this frame is determined to be appropriate in Step S1003 (Yes in S1003), router 302 routes this signal to a branch different from the branch that transmitted this frame to cause the transceiver to transmit the signal (S1004). ECU interface 303 interprets the frame from this received signal, and the received frame is stored into received-frame information holder 304 (S1005). If the correspondence between the slot where the frame is received and the branch that transmitted this frame is determined to be inappropriate (No in S1003), the process of secure star coupler 300 ends.

If no signal is being received from another branch in Step S1006 (No in S1006), secure star coupler 300 executes Steps S1004 and S1005 described above. If a signal is being received from another branch (Yes in S1006), the process of secure star coupler 300 ends.

If no signal is being received in Step S1001 (No in S1001), ECU interface 303 determines whether a notification has been received from anomaly detection ECU 310 (S1007). If no notification has been received (No in S1007), secure star coupler 300 returns to S1001. If a notification has been received (Yes in S1007), ECU interface 303 determines whether this notification indicates a frame transmission request to issue, for example, an alert to the other ECUs (S1008). If the notification indicates the frame transmission request (Yes in S1008), ECU interface 303 instructs the transceivers to transmit frames to all the branches (S1009). Then, the process of secure star coupler 300 ends. If the notification does not indicate the frame transmission request (No in S1008), ECU interface 303 determines that the notification indicates a request to update the routing table denoted by "RT" in the diagram and reflect the setting. Thus, ECU interface 303 updates the routing table and reflects the setting (S1010). Then, the process of secure star coupler 300 ends.

The inappropriate correspondence between the slot where the signal is received in Step S1001 and the branch that transmitted this signal (No in S1003), as determined in the aforementioned operation of secure star coupler 300, is an example of a first condition included in a no-transfer condition according to the present embodiment. Moreover, the reception of a signal from another branch (Yes in S1006) in the aforementioned operation of secure star coupler 300 is an example of a second condition included in the no-transfer condition according to the present embodiment.

[1.15 Operation Performed by Anomaly Detection ECU]

Next, an operation procedure performed using the information, rules, and reception history by anomaly detection ECU 310 included in in-vehicle network system 10 configured as described above is described with reference to an example. Note that the operation performed by anomaly detection ECU 310 is achieved by the components of anomaly detection ECU 310 that execute processes. Thus, the following description on the processes performed by the components of anomaly detection ECU 310 can also be understood as description on the operation performed by anomaly detection ECU 310.

Figure 15:
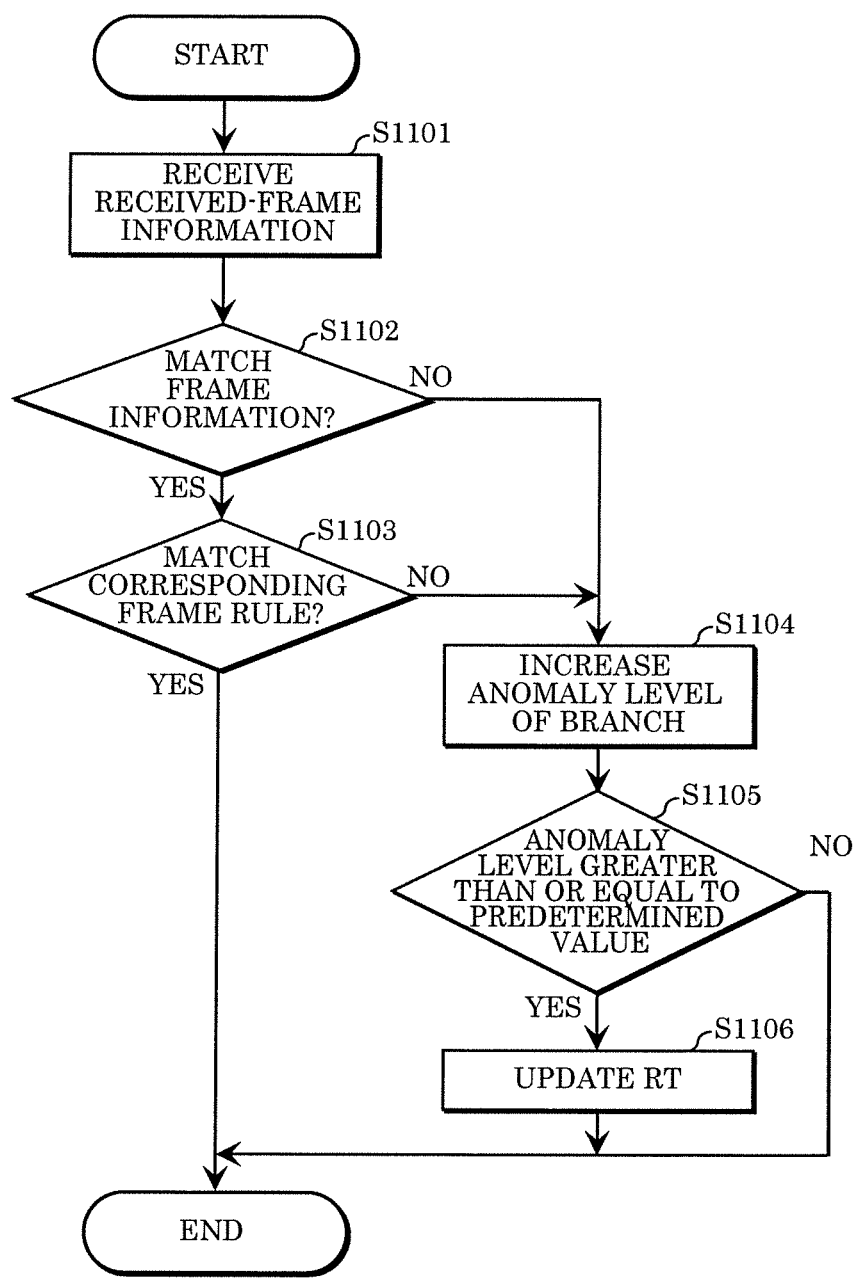
FIG. 15 is a flowchart of an example of an operation procedure performed by the anomaly detection ECU according to Embodiment 1.

FIG. 15 is a flowchart of an example of the operation procedure performed by anomaly detection ECU 310.

Star coupler communication controller 311 of anomaly detection ECU 310 receives received-frame information from secure star coupler 300 (S1101). Anomaly detector 312 verifies whether a combination of a reception branch and a reception slot ID indicated by the received-frame information matches a combination of a slot ID and a transmission source branch indicated by the frame information (see FIG. 10) stored in frame information holder 314 (S1102). If the received-frame information matches the frame information (Yes in S1102), anomaly detector 312 further verifies whether content (payload) of the received frame indicated by the received-frame information matches the corresponding frame rule stored in frame rule holder 315 (see FIG. 11) (S1103). If the content matches the corresponding frame rule (Yes in S1103), the process of anomaly detection ECU 310 ends.

If the combination of the reception branch and the reception slot ID has no match in the frame information (No in S1102) or the content of the received frame does not match the corresponding frame rule (No in S1103), anomaly detector 312 increases the anomaly level of this reception branch by 1 (S1104). Then, anomaly detector 312 determines whether the cumulative anomaly level of the reception branch is greater than or equal to a predetermined value (S1105). If the level is greater than or equal to the predetermined value (Yes in S1105), anomaly detector 312 updates the routing table of secure star coupler 300 via star coupler communication controller 311 to keep this branch from transmitting a frame that is likely to be anomalous (S1106). If the anomaly level is less than the predetermined value (No in S1105) or after the routing table is updated, the process of anomaly detection ECU 310 ends.

Note that updating of the routing table (S1106) may be achieved by, for example, deleting the routing rule in which the reception branch determined to have the anomaly level greater than or equal to the predetermined value in Step S1105 is stored as the transmission source branch. Alternatively, the routing table may further include a flag indicating whether the routing rule is allowed to be transferred.

Embodiment 2

2. System Configuration

Next, as an example according to the present disclosure, the present embodiment describes a secure star coupler and an anomaly detection ECU with reference to the drawings. The secure star coupler and the anomaly detection ECU monitor a star topology in-vehicle network and detect transmission of an anomalous frame on the basis of a blacklist and information indicating a transmitted or received frame and a transmission source branch that transmits a signal of the frame to be transferred. The secure star coupler and the anomaly detection ECU monitor may also prevent the transfer of the anomalous frame. A component having the same function as the component described in Embodiment 1 is assigned the same reference mark as in Embodiment 1, and description on this component is not repeated in the present embodiment.

A configuration of an in-vehicle network system including the aforementioned secure star coupler and anomaly detection ECU is implemented by replacing secure star coupler 300 and anomaly detection ECU 310 in-vehicle network system 10 illustrated in FIG. 1 by secure star coupler 1300 and anomaly detection ECU 1310. Except for these components, both configurations are identical. Thus, illustration and description on the identical configurations are omitted in the present embodiment. Moreover, the FlexRay cycle illustrated in FIG. 2, the FlexRay frame format illustrated in FIG. 3, the functional configuration of the ECU illustrated in FIG. 4, and the parameters, information, and rules illustrated in FIG. 7 to FIG. 13 are applicable to the present embodiment. Thus, illustration and description on these are not repeated in the present embodiment.

[2.1 Configuration of Secure Star Coupler]

Figure 16:
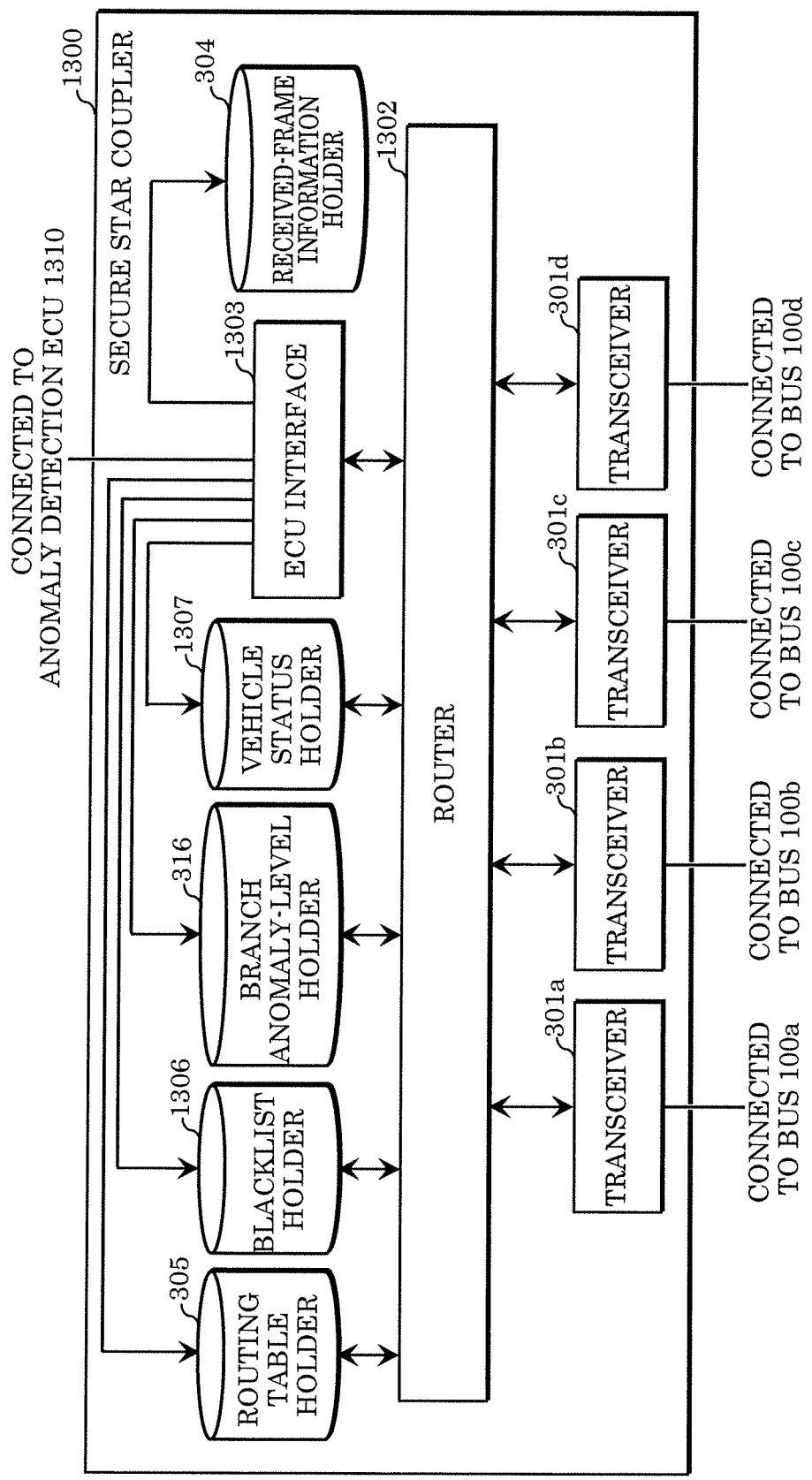
FIG. 16 is a block diagram illustrating an example of a functional configuration of a secure star coupler according to Embodiment 2.

FIG. 16 illustrates an example of a functional configuration of secure star coupler 1300. Secure star coupler 1300 includes transceivers 301a, 301b, 301c, and 301d, router 1302, ECU interface 1303, received-frame information holder 304, routing table holder 305, blacklist holder 1306, branch anomaly-level holder 316, and vehicle status holder 1307. Note that secure star coupler 1300 is provided with a microcontroller including a processor and a memory, and input and output circuits. The aforementioned components of secure star coupler 1300 are functional components that achieve a process in which the input circuit receives a signal, then the processor makes a determination by performing one or more programs stored in the memory on the signal, and then the output circuit outputs a signal to a predetermined bus in response to a result of the determination.

Router 1302 routes the digital signal notified by transceiver 301a to the transceivers except for transceiver 301a, that is, to transceivers 301b, 301c, and 301d. Similarly, router 1302 routes the digital signal notified by transceiver 301b to the transceivers except for transceiver 301b. Moreover, router 1302 notifies ECU interface 1303 of the digital signal, which is currently being routed, and the reception branch information indicating a branch from which this digital signal is being received. Furthermore, router 1302 sets a correspondence between a slot number (slot ID) and a transmission source branch (or, the transceiver connected to this transmission source branch), on the basis of a routing table stored in routing table holder 305. Router 1302 routes a signal received from a corresponding transmission source branch set in a time slot having a slot number, to another branch. Router 1302 ignores a signal received from a branch having no correspondence with the slot number. More specifically, secure star coupler 1300 does not transfer such a signal to any other branch. In a time slot in which no correspondence is set between a slot number and a transmission source branch, router 1302 routes a first received signal to a branch other than the branch from which this signal was transmitted.

While the signal is being routed, that is, before the completion of the transfer of the signal, router 1302 decodes this signal to obtain a frame and then determines whether content of the frame matches a blacklist stored in blacklist holder 1306. Router 1302 further refers to a branch anomaly level stored in branch anomaly-level holder 316 and a vehicle status stored in vehicle status holder 1307. If the content of the frame indicated by the signal, which is currently being routed, matches the blacklist and, in addition to this, the branch anomaly level and vehicle status obtained by reference satisfy a condition that makes the blacklist effective, router 1302 stops the routing of the signal. More specifically, secure star coupler 1300 stops the transfer of the signal to another branch. Thus, even if the ECU that transmits an anomalous frame is in the branch matching the routing rule included in the routing table, the frame transmitted from this ECU is determined to be anomalous on the basis of the payload value of the frame. This prevents the transfer of an anomalous frame (signal).

Router 1302 decodes the signal received from the branch to obtain a frame, and performs an error detection process to verify whether this frame has a protocol error in the branch. If an error occurs to the frame received in the slot conforming to the valid routing rule, the anomaly level of the branch that transmitted this frame is increased in branch anomaly-level holder 316. This process is performed to determine the branch that attempts the transmission of an anomalous frame. If a branch including a normal ECU that transmits a predetermined frame in a specific slot is different from a branch including an ECU that attempts to transmit an anomalous frame in this specific slot, secure star coupler 1300 determines that the anomalous frame is transmitted from the branch that does not match the routing rule and thus ignores this frame. More specifically, the transfer of the anomalous frame is prevented. However, this alone cannot identify the branch that transmitted this anomalous frame. The frame transmitted from the normal ECU is transferred to another branch by secure star coupler 1300. A collision between this transferred frame and the frame transmitted from the anomalous ECU causes only the branch including the anomalous ECU to have an error state. Router 1302 detects this error state.

When notified of the digital signal and the reception branch information by router 1302, ECU interface 1303 decodes and interprets this digital signal as a received frame. Then, ECU interface 1303 stores information about this received frame in association with the received branch information into received-frame information holder 304. Moreover, in response to a request from anomaly detection ECU 1310, ECU interface 1303 notifies anomaly detection ECU 1310 of the received-frame information and the reception branch information stored in received-frame information holder 304. Furthermore, ECU interface 1303 interprets an instruction from anomaly detection ECU 1310. With this interpretation, ECU interface 1303 rewrites the routing table stored in routing table holder 305 and indicating the transmission source branch of the signal to be transferred in the slot, updates the blacklist stored in blacklist holder 1306, updates the branch anomaly level stored in branch anomaly-level holder 316, and updates the vehicle status stored in vehicle state holder 1307.

Blacklist holder 1306 stores the blacklist that is referenced by router 1302 to determine whether to stop the transfer of the signal that is currently being transferred. FIG. 18 illustrates an example of the blacklist stored in blacklist holder 1306. The blacklist is described in detail later.

Vehicle status holder 1307 stores a vehicle status referenced by router 1302 to be used as a condition that makes the blacklist in blacklist holder 1306 effective. FIG. 19 illustrates an example of the vehicle status stored in vehicle status holder 1307. The example in FIG. 19 indicates that the vehicle status is "moving".

[2.2 Configuration of Anomaly Detection ECU]

Figure 17:
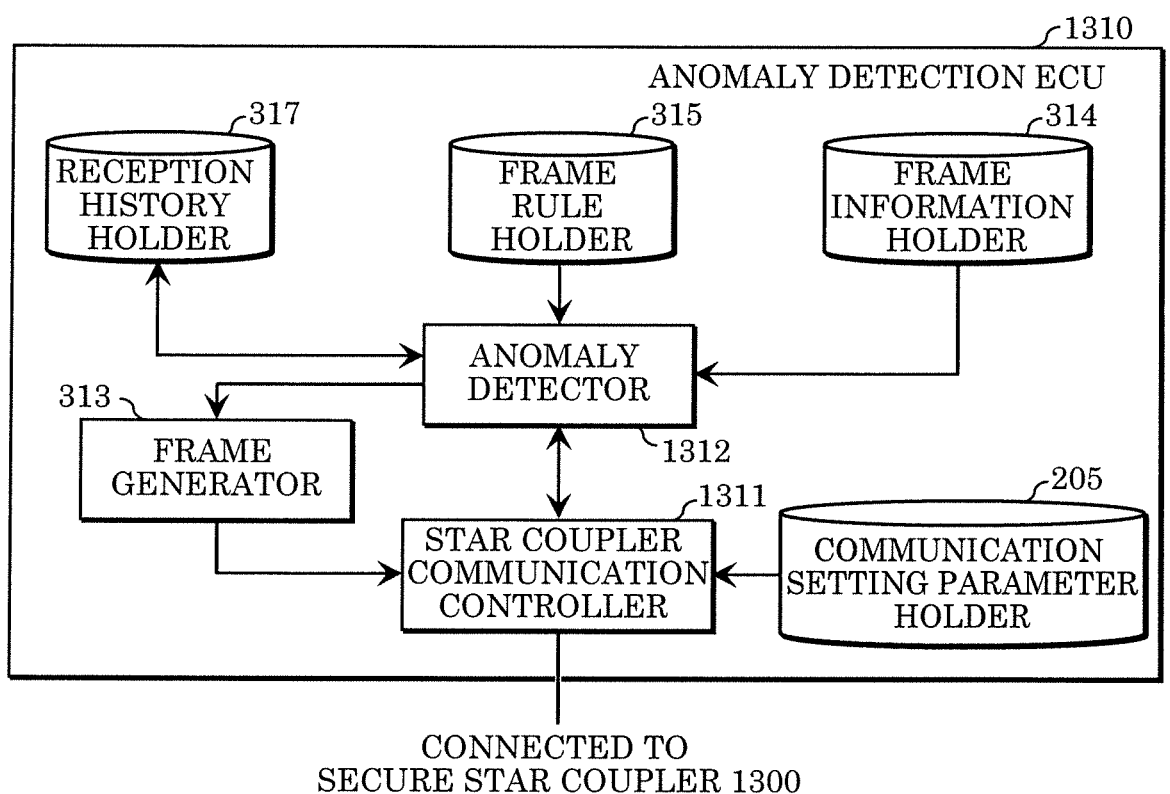
FIG. 17 is a block diagram illustrating an example of a functional configuration of an anomaly detection ECU according to Embodiment 2.

FIG. 17 is a block diagram illustrating an example of a functional configuration of anomaly detection ECU 1310.

Anomaly detection ECU 1310 includes star coupler communication controller 1311, anomaly detector 1312, frame generator 313, communication setting parameter holder 205, frame information holder 314, frame rule holder 315, and reception history holder 317.

Star coupler communication controller 1311 is a communication interface with secure star coupler 1300, and configures setting for secure star coupler 1300 on the basis of the communication setting parameters stored in communication setting parameter holder 205. The setting for secure star coupler 300 may include the blacklist and routing control information that is based on the table indicating the correspondence between the slot and the transmission source branch. Star coupler communication controller 1311 further provides a notification about the updating of the vehicle status, such as moving state, determined based on the frame received by secure star coupler 1300 and also a notification about an increase of the branch anomaly level. Star coupler communication controller 1311 receives the aforementioned received-frame information, which is the information about the received frame received by secure star coupler 1300, from secure star coupler 1300 and notifies anomaly detector 1312 of this information. In response to the frame transmission request from frame generator 313, star coupler communication controller 1311 notifies secure star coupler 1300 of the content of this frame.

On the basis of the received-frame information including the reception branch information notified by star coupler communication controller 1311, anomaly detector 1312 determines whether the received frame is anomalous. For this determination, anomaly detector 1312 first determines whether the correspondence between the frame ID of the actual received frame and the reception branch is correct, with reference to the table stored in frame information holder 314 and indicating the correspondence between the slot ID and the transmission source branch. If the correspondence between the frame ID of the received frame and the reception branch is correct, anomaly detector 1312 further refers to a rule stored in frame rule holder 315 for each type of content of the payload of the received frame and to a reception history held in reception history holder 317. With this reference, anomaly detector 1312 determines the received frame to be anomalous if the content of the payload of this received frame does not match the rule. If determining that the received frame is anomalous, anomaly detector 1312 further requests frame generator 313 for frame transmission to notify the other ECUs that an anomalous frame has been transmitted. In addition, anomaly detector 1312 notifies star coupler communication controller 1311 that the reception branch is anomalous. Moreover, to prevent the transfer of an anomalous frame from this branch to another branch from then on, anomaly detector 1312 instructs ECU interface 1303 of secure star coupler 1300 to rewrite the routing table.

[2.3 Blacklist]

FIG. 18 illustrates an example of the blacklist stored in blacklist holder 1306. Each row in the blacklist in FIG. 18 indicates a reception branch, a payload value, and a condition making the blacklist effective, for each frame received in a specific slot determined by a combination of a slot ID, a cycle offset, a cycle reception. For example, a first row is about a frame received according to a schedule where the slot ID is 20, the cycle offset is 3, and the cycle reception is 4. This row indicates that the frame matches the blacklist if the reception branch is 100*d*, the value of the payload is "5 . . . ", and the vehicle status is "moving". The row also indicates that if the branch anomaly level is greater than 30 in addition to the above, the frame transfer is terminated. Here, "*" in the blacklist indicates that the value of the corresponding bit in the payload is treated as "don't care". To be more specific, this example indicates that the received frame matches the blacklist if the value of the payload is 5 in the high-order four bits of the high-order second byte. Similarly, a second row is about a frame received according to a schedule where the slot ID is 10, the cycle offset is 0, and the cycle reception is 2. This row indicates that the frame matches the blacklist if the reception branch is 100*a* and the value of the payload is "FF 11 ** . . . ". The row also indicates that the transfer of the frame or, the signal indicating this frame that matches the blacklist is always terminated.

[2.4 Operation of Secure Star Coupler]

Next, an operation procedure performed by secure star coupler 1300 using the aforementioned information and rules is described with reference to an example. Note that the operation performed by secure star coupler 1300 is achieved by the components of secure star coupler 1300 that execute processes. Thus, the following description on the processes performed by the components of secure star coupler 1300 can also be understood as description on the operation performed by secure star coupler 1300.

Figure 20:
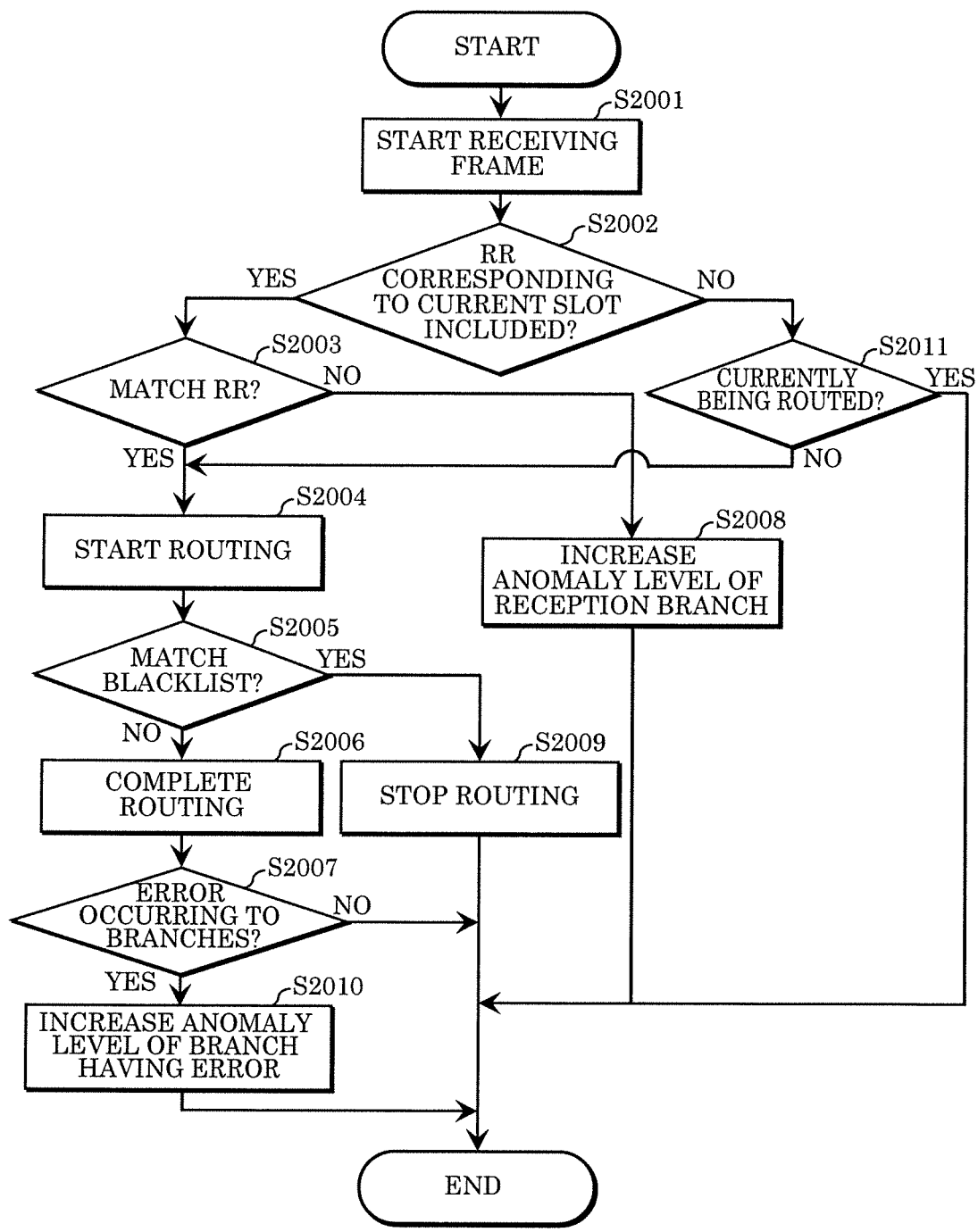
FIG. 20 is a flowchart of an example of an operation procedure performed by the secure star coupler when receiving a frame, according to Embodiment 2.

FIG. 20 is a flowchart of an example of the operation procedure performed by secure star coupler 1300 when receiving a frame.

Secure star coupler 1300 starts receiving a frame i.e., a signal indicating the frame (S2001).

Router 1302 determines whether the routing table stored in routing table holder 305 includes a routing rule denoted by "RR" in the diagram corresponding to the current slot where this signal is being received (S2002). If the corresponding routing rule is included (Yes in S2002), router 1302 makes a determination in Step S2003. If not (No in S2002), secure star coupler 1300 makes a determination in Step S2011.

In Step S2003, router 1302 verifies whether a correspondence between the slot where the signal is received and the reception branch matches the corresponding routing rule. If the correspondence matches the routing rule (Yes in S2003), router 1302 starts routing to transfer the received signal to another branch other than this reception branch (S2004). If not (No in S2003), secure star coupler 1300 increases the anomaly level of the reception branch (S2008) and ends the process.

Moreover, after starting the routing, router 1302 decodes the signal before the completion of the transfer of the signal and determines whether the frame obtained by decoding the signal matches the blacklist stored in blacklist holder 1306 (S2005). If the frame matches the blacklist (Yes in S2005), router 1302 stops the routing (S2009) and ends the process of secure star coupler 1300. If the frame does not match the blacklist (No in S2005), router 1302 completes the transfer of the signal (S2006).

After Step S2006, router 1302 verifies, for each of the branches, whether an error has occurred (S2007). If all the branches have no error (No in S2007), router 1302 determines that the transfer has completed normally and thus ends the process of secure star coupler 1300. If an error has occurred to any branch (Yes in S2007), router 1302 determines that an anomalous frame may have been transmitted and thus increases the anomaly level of the branch having the error (S2010). Then, the process of secure star coupler 1300 ends.

In Step S2011, router 1302 verifies whether a signal received from another branch in the current slot is being routed for transfer. If no routing is being performed (No in S2011), router 1302 executes S2004. If the routing is being performed (Yes in S2011), router 1302 ignores the received signal and the process of secure star coupler 1300 ends.

[2.5 Operation Performed by Anomaly Detection ECU when Receiving Frame]

Next, an operation procedure performed by anomaly detection ECU 1310 using the aforementioned information and rules is described with reference to an example. Note that the operation performed by anomaly detection ECU 1310 is achieved by the components of anomaly detection ECU 1310 that execute processes. Thus, the following description on the processes performed by the components of anomaly detection ECU 1310 can also be understood as description on the operation performed by anomaly detection ECU 1310.

Figure 21:
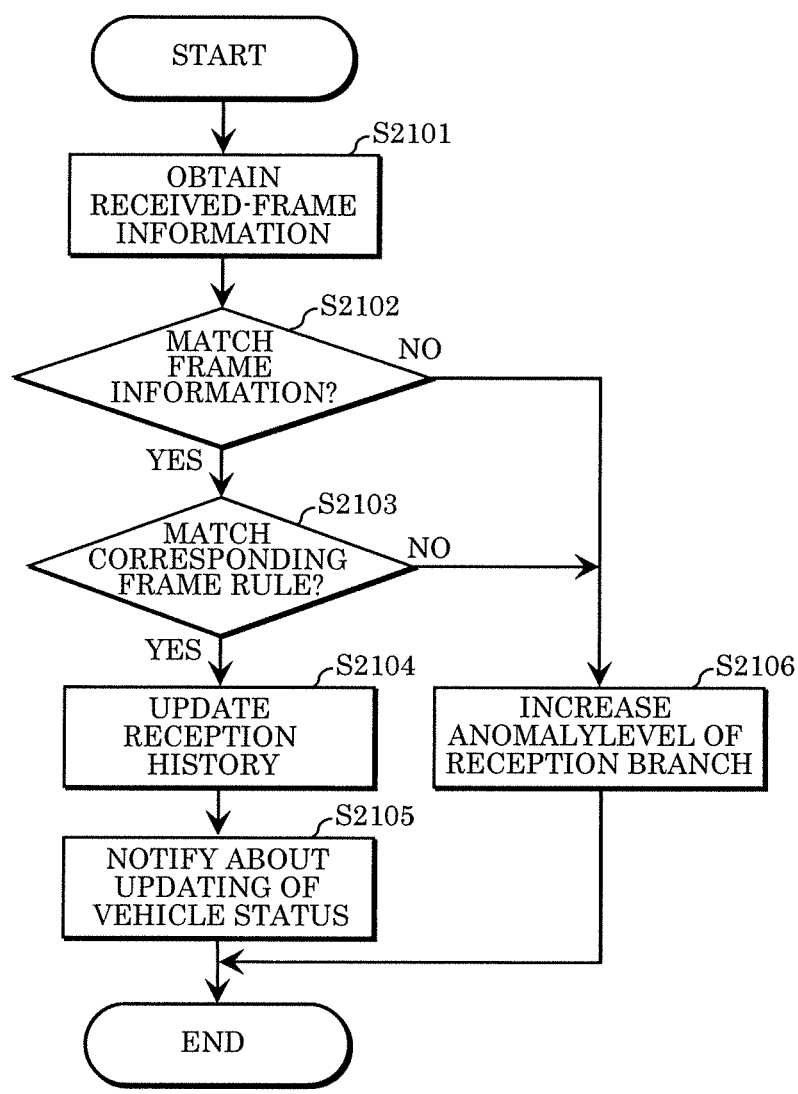
FIG. 21 is a flowchart of an example of an operation procedure performed by the anomaly detection ECU according to Embodiment 2.

FIG. 21 is a flowchart of an example of the operation procedure performed by anomaly detection ECU 1310 when receiving a frame.

When star coupler communication controller 1311 of anomaly detection ECU 1310 receives a frame reception notification from secure star coupler 1300, anomaly detector 1312 obtains received-frame information about a reception slot ID, payload information, and a reception branch of the received frame (S2101). Anomaly detector 1312 determines whether the combination of the reception branch and the reception slot ID indicated by the received-frame information is appropriate, by reference to the frame information stored in frame information holder 314 (S2102). If the combination is appropriate (Yes in S2102), anomaly detector 1312 executes Step S2103. If the combination is inappropriate (No in S2102), anomaly detector 1312 instructs secure star coupler 1300 to increase the anomaly level of this reception branch (S2106) and ends the process.

In Step S2103, anomaly detector 1312 determines whether the received frame matches the corresponding frame rule, by reference to the frame rule stored in frame rule holder 315. If the received frame matches the frame rule (Yes in S2103), anomaly detector 1312 determines that an anomalous frame has been received. Thus, anomaly detector 1312 updates the reception history stored in reception history holder 317 (S2104), and notifies secure star coupler 1300 of the updating of the vehicle status (S2105). Then, the process of anomaly detection ECU 1310 ends. If the received frame does not match the frame rule (No in S2103), anomaly detection ECU 1310 determines that an anomalous frame has been received. Thus, anomaly detection ECU 1310 instructs secure star coupler 1300 to increase the anomaly level of the reception branch (S2106) and ends the process.

3. Other Embodiments and Supplementary Description

Although the frame transfer method and the secure star coupler according to one or more aspects of the present disclosure has been described based on an embodiment, the present disclosure is not limited to this embodiment. Those skilled in the art will readily appreciate that embodiments arrived at by making various modifications to the above embodiment or embodiments arrived at by selectively combining elements disclosed in the above embodiment without materially departing from the scope of the present disclosure may be included within the present disclosure. The following describes such modifications of the embodiments and the supplementary description for the embodiments.

(1) In the above embodiments, the star network topology illustrated in FIG. 1 is described as an example. However, the applicable network topology is not limited to this example. The secure star coupler and so forth according to the present disclosure are applicable to a bus network topology and a star-bus hybrid network topology, for example.

(2) Although the secure star coupler and the anomaly detection ECU are described as separate components in the above embodiments, these two may be combined into one piece. Alternatively, some functional components included in one of these two may be built in the other. This reduces the component count. In this case, the aforementioned steps in the operation executed by the components of the secure star coupler may be executed by the anomaly detection ECU. Similarly, the aforementioned steps in the operation executed by the components of the anomaly detection ECU may be executed by the secure star coupler. Here, the combination of the secure star coupler and the anomaly detection ECU is still referred to as the secure star coupler for the sake of convenience according to the present disclosure. Regardless of its designation, the piece implemented by combining the components of the secure star coupler and the components of the anomaly detection ECU according to the present disclosure is included in the technical scope according to the present disclosure.

(3) Although the secure star coupler and the anomaly detection ECU communicate with each other in the above embodiments, the anomaly detection ECU is not an essential component. For example, the content of the routing table holder and the content of the communication setting parameter holder may be previously included in the secure star coupler. With this, operation may be performed using only essential functions at the beginning. This can reduce the number of communication devices on the communication network, and thus is effective in lowering the cost.

(4) The above embodiments describe no detailed process after the anomaly detection process performed to determine whether an anomalous frame has occurred or a frame is anomalous. A supplementary explanation is provided on an example of using the result of this determination. For example, information included in the header, the value of the payload, the reception time, and the vehicle status at the time of reception of the anomalous frame, hereinafter, at least a part of these information items may also be referred to as the anomalous frame information, may be stored in a log. Moreover, the other ECUs on the in-vehicle network may be notified about the occurrence of the anomalous frame or about the anomalous frame information. Alternatively, an external server may be notified about the occurrence of the anomalous frame or about the anomalous frame information. The driver may be notified, via a user interface of the vehicle, about the occurrence of the anomalous frame on the in-vehicle network or about the anomalous frame information. Moreover, if a gateway or a domain controller includes an anomaly detector, a process may be executed, such as not transferring the anomalous frame or transferring the frame together with information indicating that the frame is anomalous.

(5) Although stored in plain text in the above embodiments, the frame information and the frame rule may be stored in encrypted form.

(6) Although stored for each branch in the above embodiments, the anomaly level may be stored for each frame. This allows only a frame having a high anomaly level to be blocked, and thus is effective in reducing the effects on the vehicle.

(7) Although one reception rule is set for each frame rule in the above embodiments (see FIG. 11), two or more rules may be set. Moreover, an individual frame rule having no reception rule may be used. For example, a reception rule may be set only for a second type of frame that is of high importance. This allows checking to be performed according to importance of the frame, and thus is effective in enhancing the safety of the in-vehicle network.

(8) Although no frame rule is set for a dynamic frame in the above embodiments (see FIG. 11), a frame rule may also be set for the dynamic frame. For example, a rule about the amount of change from the last reception value may be set.

(9) Although the secure star coupler is capable of receiving the frame transmission request from the anomaly detection ECU and transmitting the frame to another branch, the secure star coupler may not transmit the frame. This can reduce the functions of the secure star coupler, and thus is effective in reducing the cost.

(10) Although the frame name is included in the frame information stored in the frame information holder (see FIG. 10), the frame name is not essential.

(11) Although one item of one kind is held as the payload information of one frame in the frame information stored in the frame information holder in the above embodiments (see FIG. 10), this is not intended to be limiting. One frame may hold two or more kinds of information or a plurality of information items of the same kind. Alternatively, the frame may hold no payload information. When holding a plurality of payload information items, the frame may include information indicating a field (such as position, length, and unit of the field) for each item in the payload segment.

(12) In the above embodiments, the previous reception value in the reception history (see FIG. 13) is stored corresponding to only one signal for each frame name. However, the values corresponding to a plurality of signals may be stored. Moreover, the payload value may be stored as it is.

(13) In the above embodiments, the vehicle status included in the reception history (see FIG. 13) is either one of the two states, moving or stopped. However, the vehicle status is not limited to these two states. For example, the vehicle status may indicate an ignition-on state, an accessory-on state, a low-speed moving state, a high-speed moving state, a steering operation status, a gear status, an advanced driver-assistance function on/off state, or a state of any combination of these.

(14) Embodiment 2 above describes the example in which the blacklist (see FIG. 18) is previously stored. However, the blacklist may be dynamically updated after being used. For example, the value of the payload of the frame detected to be anomalous by the anomaly detection ECU may be stored. Then, if anomalous frames are detected a predetermined number of times or more in the slots having the same ID, the same cycle reception, and the same cycle offset, the blacklist may be updated using the fields in which these frames have the same payload value. This can prevent the routing of an anomalous frame that is not previously stored in the blacklist and has a newer attack pattern. Thus, this is effective in enhancing the safety.

(15) In Embodiment 2 above, the router has the function of detecting an error of the frame obtained by decoding the signal. The error detection function may not be carried out in the router (the secure star coupler). For example, the anomaly detection ECU connected to the secure star coupler may be capable of receiving signals from any two branches, and a decoder included in the anomaly detection ECU may perform error detection.

(16) In Embodiment 2 above, the transfer of the frame (signal) matching the blacklist (see FIG. 18) is stopped. However, a process other than the process of stopping the transfer of the frame (signal) matching the blacklist may be performed. For example, the value of the CRC included in the frame may be rewritten. Any handling method capable of preventing the transferred signal from being received and processed as a valid frame by another ECU may be used.

(17) In Embodiment 2 above, the transfer of a frame (signal) is stopped if the frame matches the blacklist (see FIG. 18) indicating an inappropriate correspondence between the time slot and the payload value included in the frame. This is not intended to be limiting. The transfer of a signal may be stopped if the signal does not match a whitelist indicating an appropriate correspondence between the time slot and the payload value included in the frame. These blacklist and whitelist are examples of an anomaly reference list according to Embodiment 2 and the present variation. The blacklist holder is an example of an anomaly reference list holder.

(18) In Embodiment 2 above, the vehicle status and the branch anomaly level are used as the conditions that make the blacklist (see FIG. 18) effective. However, the vehicle status and the branch anomaly level may be used as the conditions that make the routing rule (see FIG. 9) effective. This effectively disables the frame transmission from a branch including an anomalous ECU.

(19) Although the vehicle status holder stores the moving state of the vehicle in Embodiment 2 above (see FIG. 19), this is not intended to be limiting. For example, the ignition-on state or the like described above may be stored. Moreover, a predetermined status notified by an ECU, such as a flag indicating the status of the external device connected to the ECU, may be stored. With this, the blacklist can be made effective according to the flag, and can be more flexible in response to various statuses of the vehicle.

(20) Although the above embodiments describe the in-vehicle network using the FlexRay protocol, this is not intended to be limiting. For example, CAN, CAN with Flexible Data Rate (CAN-FD), Ethernet (registered trademark), Local Interconnect Network (LIN), or Media Oriented Systems Transport (MOST) may be used. Alternatively, a network implemented by combining any of these networks as subnetworks may be used. This is effective particularly to a network adopting the time-triggered protocol. The above embodiments describe an example of the secure star coupler included in the in-vehicle network and an example of the method by which the secure star coupler prevents the transfer of an anomalous frame. Note that the secure star coupler and so forth in aspects according to the present disclosure are applicable to communication networks other than in-vehicle networks.

(21) An example of each device according to the above-described embodiments is a computer system including a microprocessor, a Read Only Memory (ROM), a Random Access Memory (RAM), a hard disk unit, a display unit, a keyboard, a mouse, and the like. The RAM or the hard disk unit holds a computer program. The microprocessor operates according to the computer program, thereby causing the constituent elements to execute their functions. Here, the computer program includes combinations of instruction codes for issuing instructions to the computer to execute predetermined functions.

(22) It should also be noted that a part or all of the constituent elements in each of the devices according to the above-described embodiments may be implemented into a single Large Scale Integration (LSI). The system LSI is a super multi-function LSI that is a single chip into which a plurality of constituent elements are integrated. More specifically, the system LSI is a computer system including a microprocessor, a ROM, a RAM, and the like. The RAM holds a computer program. The microprocessor operates according to the computer program, thereby causing each of the constituent elements to execute their functions.

Each of the constituent elements included in each of the above-described devices may be integrated separately, or a part or all of them may be integrated into a single chip.

The system LSI is described here, but the integrated circuit may also be referred to as an integrated circuit (IC), a system LSI circuit, a super LSI circuit or an ultra LSI circuit depending on the degree of integration. Moreover, the circuit integration technique is not limited to LSI, and may be realized by a dedicated circuit or a general purpose processor. After manufacturing of the LSI circuit, a field programmable gate array (FPGA) or a reconfigurable processor which is reconfigurable in connection or settings of circuit cells inside the LSI circuit may be used.

Further, when development of a semiconductor technology or another derived technology provides a circuit integration technology which replaces LSI, as a matter of course, functional blocks may be integrated by using this technology. Adaption of biotechnology, for example, is a possibility.

(23) It should also be noted that a part or all of the constituent elements included in each of the above-described devices may be implemented into an Integrated Circuit (IC) card or a single module which is attachable to and removable from the device. The IC card or the module is a computer system including a microprocessor, a ROM, a RAM, and the like. The IC card or the module may include the above-described super multi-function LSI. The microprocessor operates according to the computer program to cause the IC card or the module to execute its functions. The IC card or the module may have tamper resistance.

(24) The present disclosure may be the above-above described methods. These methods may be a computer program executed by a computer, or digital signals forming the computer program.

The present disclosure may be a computer-readable recording medium on which the computer program or the digital signals are recorded. Examples of the computer-readable recording medium are a flexible disk, a hard disk, a Compact Disc-Read Only Memory (CD-ROM), a magnetooptic disk (MO), a Digital Versatile Disc (DVD), a DVD-ROM, a DVD-RAM, a BD (Blu-ray(registered trademark) Disc), and a semiconductor memory. The present disclosure may be the digital signals recorded on the recording medium.

The present disclosure may be implemented by transmitting the computer program or the digital signals via an electric communication line, a wired or wireless communication line, a network represented by the Internet, data broadcasting, and the like.

The present disclosure may be a computer system including a microprocessor and a memory. The memory stores the computer program and the microprocessor operates according to the computer program.

It is also possible that the program or the digital signals may be recorded onto the recording medium to be transferred, or may be transmitted via a network or the like, so that the program or the digital signals can be executed by a different independent computer system.

(25) The above-described embodiments and the above-described variations may be combined.

INDUSTRIAL APPLICABILITY

The technology according to the present disclosure is usable for a communication network, particularly for a network adopting the time-triggered protocol, to handle an anomalous frame transmitted by a cyberattack for example.

What is claimed is:

1. A secure star coupler in a communication network adopting a time-triggered protocol that transmits a frame in a predetermined time slot among a plurality of time slots,
the communication network including a plurality of branches that are connected to each other via the secure star coupler and each of which includes at least one communication device and a bus, the at least one communication device transmitting and receiving a frame in a corresponding predetermined time slot,
the secure star coupler, comprising:
a routing rule holder;
a router; and
a plurality of transceivers each of which is connected to a corresponding one of the plurality of branches,
wherein the routing rule holder holds a predetermined rule including at least one combination of (i) one time slot among the plurality of time slots and (ii) one of (ii-1) a transmission source branch among the plurality of branches that transmits a physical signal to be transferred by the secure star coupler in the one time slot and (ii-2) a transceiver connected to the transmission source branch among the plurality of transceivers,
the plurality of transceivers includes a first transceiver, the first transceiver receiving a first physical signal transmitted from a first branch in a first time slot among the plurality of time slots, from a bus included in the first branch connected to the first transceiver, converting the first physical signal into a first digital signal,
the router routes the first digital signal to a transceiver other than the first transceiver among the plurality of transceivers, except when one of (i) a first condition is satisfied and (ii) a second condition is satisfied, a determination is made between whether one of the first condition is satisfied or the second condition is satisfied based on whether or not a routing rule corresponding to a timing of receipt of the first physical signal is stored in the routing rule holder,
the transceiver other than the first transceiver converts the first digital signal that is routed into a physical signal, and transmits the physical signal to a bus included in a branch other than the first branch among the plurality of branches,
the first condition indicates that a combination of (i) the first time slot and (ii) one of the first branch and the first transceiver does not satisfy the predetermined rule, and
the second condition indicates that the router is routing a second digital signal to a branch other than a second branch among the plurality of branches, the second digital signal being generated by converting a second physical signal transmitted from the second branch in the first time slot and received from a bus included in the second branch, into the second digital signal.

2. The secure star coupler according to claim 1, further comprising
a communication controller that communicates with the at least one communication device, and
a received-frame information holder,
wherein the communication controller decodes and interprets the first digital signal as a first frame, a received-frame information holder holds received-frame information in which information about the first frame is associated with an identifier indicating one of the first branch and the first transceiver that is a transfer source of the first digital signal, and
the communication controller notifies the at least one communication device of the received-frame information.

3. The secure star coupler according to claim 2, further comprising
a branch anomaly-level holder that holds an anomaly level for each of the plurality of branches,
wherein a third transceiver among the plurality of transceivers receives a third physical signal transmitted from a third branch in a second time slot among the plurality of time slots, from a bus included in of the third branch connected to the third transceiver among the plurality of branches, converting the third physical signal into a third digital signal,
when a combination of (i) the second time slot and (ii) one of the third branch and the third transceiver does not satisfy the predetermined rule, the router increases an anomaly level of the third branch, and
when the anomaly level of the third branch is greater than or equal to a predetermined value, the router does not transfer the third digital signal to a transceiver other than the third transceiver among the plurality of transceivers.

4. The secure star coupler according to claim 3,
wherein the communication controller decodes and interprets the third digital signal as the first frame,
the router detects whether a third frame has an error in a communication protocol used for the communication network, and increases the anomaly level of the third branch when the router detects that the third frame has an error in the communication protocol and the combination of (i) the second time slot and (ii) one of the third branch and the third transceiver satisfies the predetermined rule.

5. The secure star coupler according to claim 2, further comprising
an anomaly reference list holder that holds an anomaly reference list indicating at least one appropriate combination or at least one inappropriate combination of one time slot among the plurality of time slots and a value of a payload included in a frame,
wherein the router performs verification of the first frame against the anomaly reference list, and
the router stops the transfer of the first digital signal when the router determines that the correspondence is not appropriate as a result of the verification.

6. The secure star coupler according to claim 5,
wherein the communication network is an in-vehicle network,
the secure star coupler further comprises a vehicle status holder that holds vehicle information indicating a status of a vehicle including the in-vehicle network,
the communication controller updates the vehicle information using information received from the at least one communication device, and
the router stops the transfer of the first digital signal when the router determines that the correspondence is not appropriate as a result of the verification and the status of the vehicle indicated by the vehicle information satisfies a predetermined condition.

7. The secure star coupler according to claim 1, wherein the router selectively performs one of (i) determining whether or not the first condition is satisfied and (ii) determining whether or not the second condition is satisfied.

8. A frame transfer method used in a communication network adopting a time-triggered protocol that transmits a frame in a predetermined time slot among a plurality of time slots,
the communication network including a plurality of branches that are connected to each other via a secure star coupler and each of which includes a bus and at least one communication device, the at least one communication device transmitting and receiving a frame in a corresponding predetermined time slot, the secure star coupler including a routing rule holder, a router; and a plurality of transceivers each of which is connected to a corresponding one of the plurality of branches,
the routing rule holder holding a predetermined rule including at least one combination of (i) one time slot among the plurality of time slots and (ii) one of (ii-1) a transmission source branch among the plurality of branches that transmits a physical signal to be transferred by the secure star coupler in the one time slot and (ii-2) a transceiver connected to the transmission source branch among the plurality of transceivers;
the frame transfer method, comprising:
receiving, by a first transceiver among the plurality of transceivers, a first physical signal transmitted from a first branch in a first time slot among the plurality of time slots, from a bus included in the first branch connected to the first transceiver,
converting, by a first transceiver, the first physical signal received from a bus of a first branch among the plurality of branches into a first digital signal;
routing, by the router, the first digital signal to a branch other than the first branch among the plurality of branches except when one of (i) a first condition is satisfied and (ii) a second condition is satisfied, a determination is made between whether one of the first condition is satisfied or the second condition is satisfied based on whether or not a routing rule corresponding to a timing of receipt of the first physical signal is stored in the routing rule holder; and
converting, by a transceiver other than the first transceiver among the plurality of transceivers, the first digital signal that is routed in the routing into a physical signal, and transmitting, by a transceiver, the physical signal to a bus included in a branch other than the first branch, wherein
the first condition indicates that a combination of (i) the first time slot and (ii) the first branch does not satisfy the predetermined rule, and
the second condition indicates that the router is routing a second digital signal to a branch other than a second branch among the plurality of branches, the second digital signal being generated by converting a second physical signal transmitted from the second branch in the first time slot and received from a bus included in the second branch, into the second digital signal.

9. The frame transfer method according to claim 8, wherein
the routing of the first digital signal includes selectively performing one of (i) determining whether or not the first condition is satisfied and (ii) determining whether or not the second condition is satisfied.

* * * * *